(12) United States Patent
Eromäki

(10) Patent No.: US 6,374,886 B1
(45) Date of Patent: Apr. 23, 2002

(54) VEHICLE TIRE WITH LAMELLAR STUDS

(75) Inventor: Pentti Eromäki, Nokia (FI)

(73) Assignee: Nokian Tyres Plc., Nokia (FI)

( * ) Notice: Subject to any disclaimer, the term of this patent is extended or adjusted under 35 U.S.C. 154(b) by 0 days.

(21) Appl. No.: 09/430,371

(22) Filed: Oct. 29, 1999

(51) Int. Cl.[7] .......................... B29D 30/66; B60C 11/14; B60C 11/16; B60C 11/18
(52) U.S. Cl. ...................... 152/210; 156/114
(58) Field of Search .................. 152/210, 211, 152/212; 156/114; 29/450, 235, 815; 36/59 B

(56) References Cited

U.S. PATENT DOCUMENTS

| | | | | |
|---|---|---|---|---|
| 3,348,291 A | * | 10/1967 | Niedzwiecki | |
| 3,403,435 A | * | 10/1968 | Holder | 152/210 |
| 3,504,414 A | * | 4/1970 | Breen | 29/235 |
| 3,616,720 A | * | 11/1971 | Larson | 29/450 |
| 3,710,435 A | * | 1/1973 | Cordo | 29/525 |
| 3,831,655 A | | 8/1974 | Cantz | |
| 3,842,880 A | * | 10/1974 | Keinanen | 152/210 |
| 4,603,721 A | | 8/1986 | Kogure et al. | |
| 5,800,644 A | | 9/1998 | Eromäki | |

FOREIGN PATENT DOCUMENTS

| | | | | |
|---|---|---|---|---|
| DE | 1 027 089 | | 3/1958 | |
| DE | 2342743 | * | 3/1975 | 152/210 |
| DE | 28 04 939 | | 8/1979 | |
| EP | 0 204 030 | | 12/1986 | |
| EP | 0 864 449 A2 | | 9/1998 | |
| GB | 545632 | * | 6/1942 | 152/211 |
| JP | 61-18506 | | 1/1986 | |
| JP | 7-1921 | * | 1/1995 | 152/210 |
| WO | WO 96/28310 | | 9/1996 | |

* cited by examiner

Primary Examiner—Steven D. Maki
(74) Attorney, Agent, or Firm—Klarquist Sparkman, LLP

(57) ABSTRACT

The invention relates to a vehicle tire (50) comprising a tire carcass (51) and side walls (53); a layer or layers of rubber forming a tire tread (56) on top of the carcass; a tread pattern comprising a plurality of blocks (11) separated by grooves (22). There are anti-skid stud holes (12) in the blocks, said anti-skid stud holes having a total depth within said tread rubber layer and having a generally circular or oval cross-sectional form. Lamellar anti-skid studs (1) are inserted in the stud holes, the ratio of the total thickness (D1) of said lamellar studs to the width (L) of said lamellar studs in the orientation of the tread surface (20) being at maximum one-third. The diameter or respectively the main dimension of said circular/oval stud holes (12) is substantially smaller than the width (L) of the inserted lamellar studs.

29 Claims, 6 Drawing Sheets

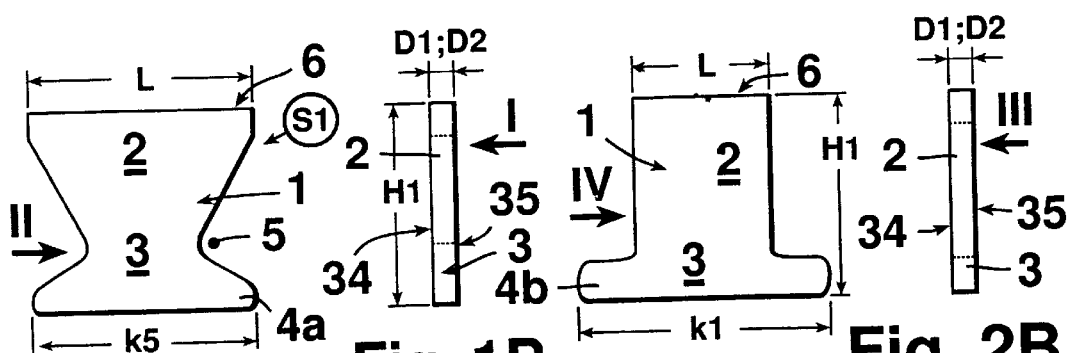
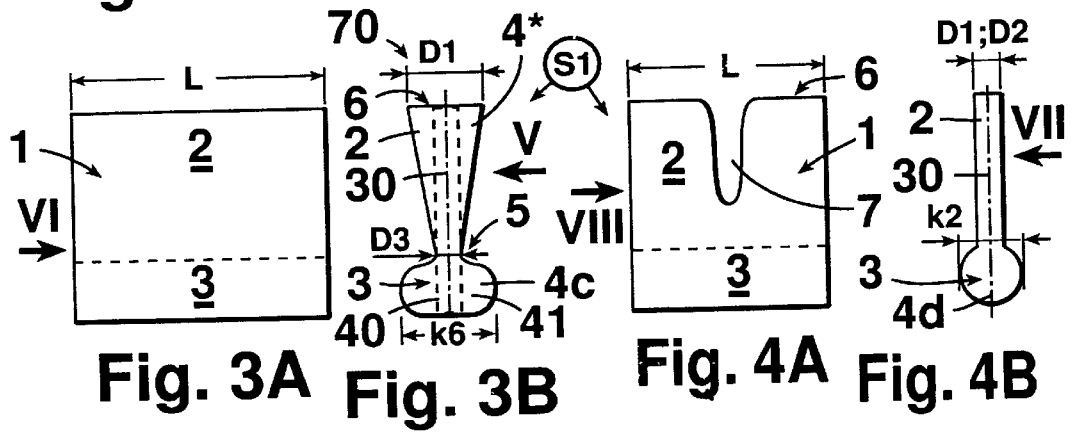
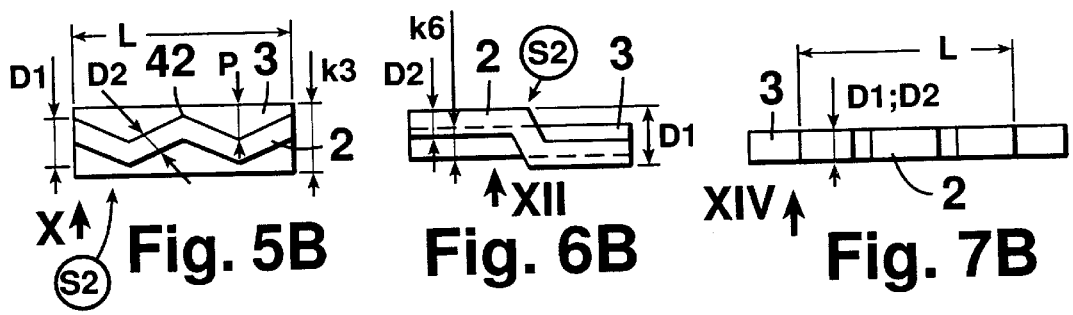
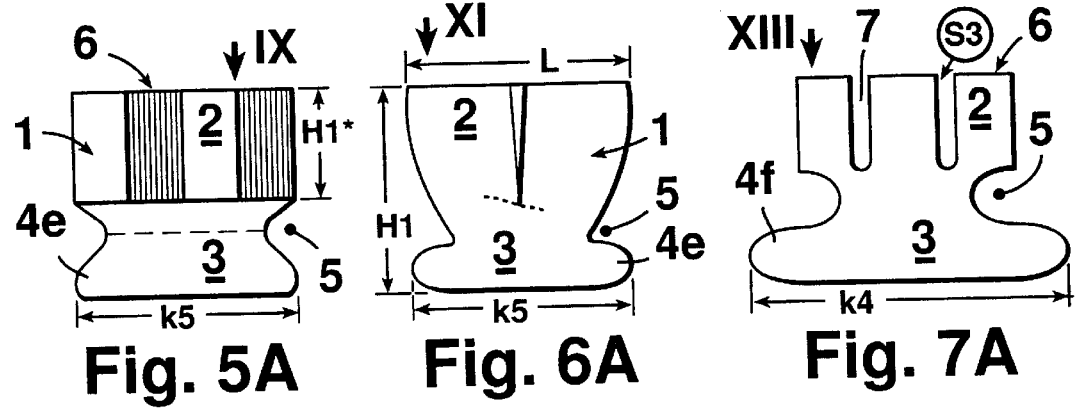

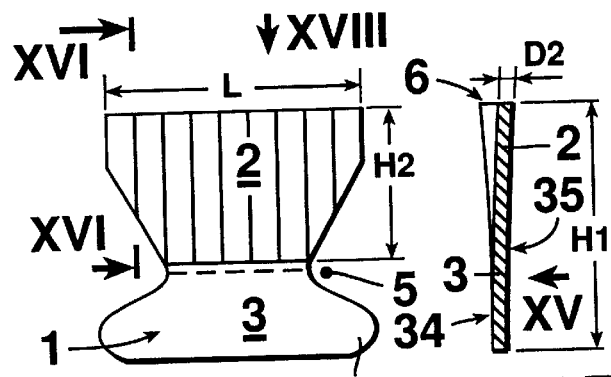
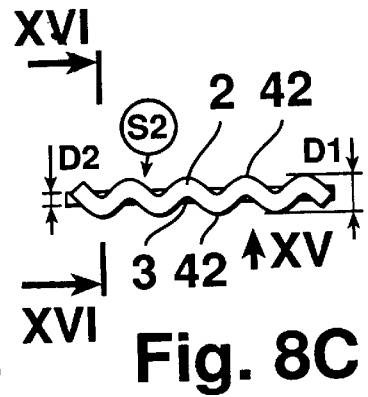
Fig. 8A  Fig. 8B  Fig. 8C
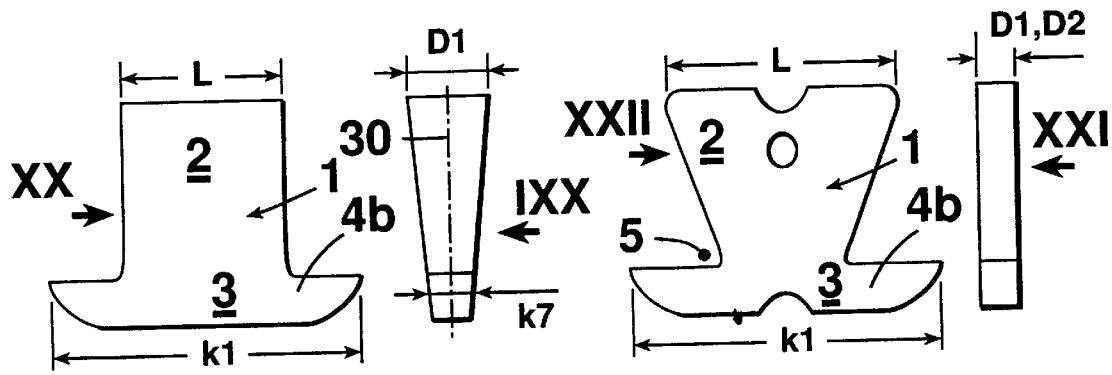
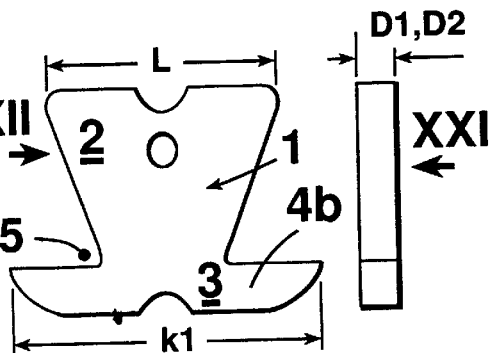
Fig. 9A  Fig. 9B  Fig. 10A  Fig. 10B
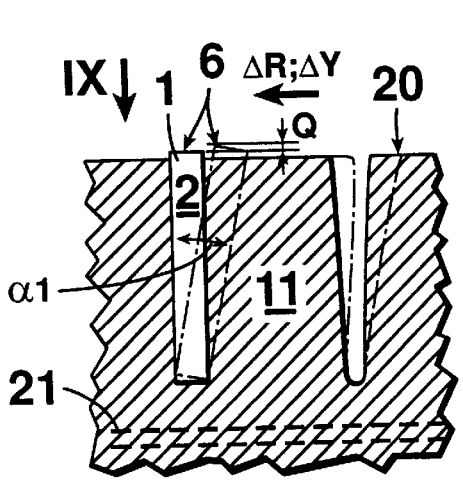
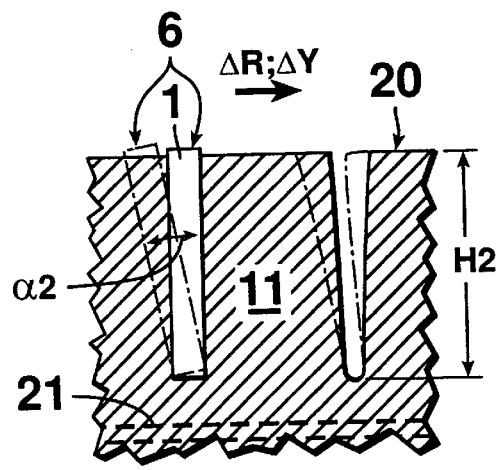
Fig. 11A  Fig. 11B

VEHICLE TIRE WITH LAMELLAR STUDS

FIELD OF THE INVENTION

The invention relates to vehicle tires comprising a tire carcass and side walls, wherein at least one layer of rubber forms a tire tread with a tread surface on top of the carcass. A tread pattern is provided in said tread rubber layer comprising a plurality of blocks at least in the circumferential direction of the tire and separated by grooves, and anti-skid stud holes within at least some of said blocks. Anti-skid studs are inserted in said stud holes, said studs comprising having a flat lamellar configuration with a stem portion and a basal portion. The diameter or the main and minor dimensions of said stud holes has/have a predetermined relationship to the respective dimensions of said studs. The invention further relates to vehicle tires of said type with a tire tread comprising at least two layers of rubber, wherein the base of the tread consists of a first harder rubber layer next to the tire carcass and the cap of the tread consists of a second more resilient rubber layer forming the tread surface, and elastic cushions disposed at the interior of the anti-skid stud holes.

DESCRIPTION OF THE RELATED ART

There have lately been various attempts to enhance the grip of winter tires in particular. The grip can be increased with a pattern on the tread of the tire especially with a view to driving on snow. However, in driving on a snowy or icy roadway, the properties of the rubber forming the tread and the anti-skid studs fixed to the tread will have a more notable impact. The friction between the road surface covered with ice and/or compacted snow and the tread of the tire can be increased with the use of special friction rubber qualities in the tread. Such rubber qualities are very soft, i.e. they have high elasticity and a hardness typically in the range from 55 to 65 sh° A.

They are commonly called "cap rubbers". If, however, the rubber layer on top of the tire carcass is throughout formed of such soft cap rubber alone all the way to the tread surface, the tire will sway too much during driving to be apt for many purposes of use, precisely due to this excessive elasticity. This is why the treads of tires have lately been formed of a combination of such soft cap rubber and a harder rubber layer as disclosed in publication U.S. Pat. No. 4,603,721. The harder rubber quality, placed closer to the tire carcass, is commonly called "base rubber", and its hardness is typically in the range from 65 to 75 sh° A. The surface pattern being pressed into this kind of a rubber layer composite within a tire mold for vulcanization, the major part of the height of the blocks for the surface pattern, i.e. the vertical dimension of the grooves from the tread surface, will consist of the more elastic cap rubber, whereas the portion between the surface pattern and the carcass and a part of the height of the surface pattern will be chiefly of the harder base rubber. This design yields a "friction tire", having a high friction coefficient with regard to a hard driving surface, while the roadholding and driving properties of the tire still remains good owing to the harder base rubber layer. This kind of "friction tires" are expressly intended to be used and are used without any kind of additional anti-skid elements, in order to avoid wearing of roads.

The use of a harder base rubber layer between the surface pattern and the tire carcass, and partly within the surface pattern blocks, entails the same drawbacks as in the case of more conventional tires, in which the tire tread is entirely made of a harder rubber than the cap rubber mentioned above. When such a tire is provided with conventional anti-skid studs in the stud holes, the bottom flange of the stud within the tire tread opposite to the stud tip will be located in and against this hard rubber, and as a consequence of this, a relatively great force will be required on a road to press the tip of the stud to the plane of the tread. This will occur in any case under the weight of the vehicle, but the great penetrating force of the stud will entail considerable wear of the road surface and also considerable tire noise. What is more, this great penetrating force will prevent studs from being placed in the central parts of the tire, where the grip of the stud would otherwise be utilized at maximum. Current regulations explicitly forbid placing studs in the central parts of tires and allow studs to be placed close to the tire shoulder alone, where surface pressure between tire and road is lower, reducing wear of the road but also impairing the grip of the studs.

Publication JP-61-18506 discloses a tire with a supporting ring-band of a soft rubber quality extending in the circumferential direction of the tire and embedded in the tire tread between the carcass and outer parts of the tread. The width of this supporting ring-band is smaller than the total width of the tire and the supporting ring-band is positioned in the area of studs only. This construction of the tire tread destroys the at least the driving properties of the tire, making it to sway if the ring-band is made broad enough to allow a proper positioning of studs. If the supporting ring-band is kept so narrow that the acceptable driving properties are maintained the studs can be placed within so narrow an area that their effectiveness is considerably lowered.

Publication U.S. Pat. No. 3,831,655 discloses a special anti-skid spike for vehicle tires with at least one individual elastic member between the foot portion of the spike and the bottom of the hole in the tire tread. The individual elastic member may be prepared from a rubber material or a plastic material or it can be a metallic spring or a combination thereof. This disclosed elastic member is in each case fixed to the underside of the foot portion of the spike and preferably adhered either with glue or vulcanization thereto. The disclosed spike construction with an elastic member requires fabrication of tiny springy elements whether of rubber, plastic or metal, and an elaborate adhering of these elements to spikes, and/or a complicated insertion method to retain a proper mutual position of each of the springy elements and the respective spike bodies. The arrangement is impractical and the tires produced would be too expensive.

The well-known anti-skid studs are typically made up of a round pin of a cemented carbide, so called "hard-metal" composed of mainly tungsten carbide as the hard component and cobalt in small amounts—generally from 5% to 10%—as the binder, placed in a larger round body of steel, having a stem portion towards the tread surface of the tire and a flange-like basal portion towards the carcass of the tire. The manufacturing is relatively complicated and expensive, because the steel body has to be machined, the cemented carbide pin has to be moldpressed and sintered, and finally these parts shall be soldered together. These anti-skid elements are pressed into holes which are preformed in the tire tread. They are known to have the disadvantages of a relatively large weight—density of WC is 15.7 $g/cm^3$—and a tendency to increase their projection measured outwards from the tread surface during use, thus causing studs to become detached during the wear of the tire. The high stud weight and the large stud projection cause severe wear of the road surface and high tire noise. The tendency of the studs to become detached is also increased by the tilting of the stud, made possible by this known structure. Efforts have been made to reduce this tendency of the studs to become detached by using a stud design described in publication DE-28 04 939, in which the stud is V-shaped in cross-sectional planes parallel to the tread surface and which has, over the stud length, dovetail-like projections pointing outwards from the inside of the tire, but no actual basal flange. This design very effectively prevents the tilting of the stud and possibly thus, together with the dovetail projections, reduces the tendency of the studs to become detached. However, since studs of the type described have in the orientation of the tread the thickness of the conventional studs but are considerably longer than these, the weight of the studs described in the said publication is considerably greater than that of conventional round studs. This results in still higher tire noise, extensive wear of the road surface, and the subjection of the tire to high stresses which may damage it. Publication DE-1 027 089 discloses a non-slip element, which has a form of a thin corrugated band and which is vulcanized within the tire tread during manufacturing of the tire. In order to ensure the fitting between the rubber of the tread and the element, the element is provided with penetrating holes. This kind of suggested non-slip element is not practical nor effective, because it is not possible to produce elements with required dimensions and form using material, which has a hardness and strength high enough. If the production of a thin corrugated band of a material common in studs, like cemented carbides, and the installation thereof within the tread were somehow possible, the non-slip element would anyway break to pieces and is thrown out of the tire after a very short driving distance. Those materials which can be shaped to thin corrugated bands wear quite too rapidly to cause any discernibly added friction between the tire and the road surface, when compared to friction between a bare tire and the road surface. Thicker non-slip bands again lead to a too high weight, which damages the tire during driving.

The anti-skid studs described above work in the conventional manner that the grip of the stud is produced by the penetration of the "hard-metal" part of the stud into the road surface under the effect of the projection of the stud tip from the plane of the tire tread. In this case the grip of the stud is thus based on the penetration force of the stud in the orientation of the tire radius. In the publications WO-96/28310 and EP-0 204 030 anti-skid elements based on another operating principle are described. In these publications, the anti-skid elements are positioned so that their projection from the tread surface is zero or very small, in which case, when the tire is rolling at a constant speed, there is either no contact or only very slight contact between the anti-skid element and the road surface. When the car is braked or accelerated, the deformation of the tire rubber causes the anti-skid elements to tilt, whereupon some edge of their very large end face oriented outwardly from the tire impinges on the road surface owing to the slight projection increase caused. In these publications, an effort has been made to maximize this projection increase by making the area of the stud end face very large in the orientation of the tread surface, because larger diameter causes greater projection during the tilting. For this reason, especially the stud according to publication WO-96/28310 is considerably heavier than a conventional anti-skid stud, as is admitted even in its Finnish priority application, wherefore for this later publication, an effort has been made to reduce this extra weight by giving the stem part of the anti-skid element the shape of a hollow cone. In spite of this, the weight of the anti-skid element according to publication WO-96/28310 is approximately double the maximum weight currently permitted by the regulations in Finland. Furthermore, experiments have shown that the projection, measured from the tread surface, of the studs according to these two publications increases considerably during use, causing rapid detaching of the anti-skid elements. In the main, the above also applies to the anti-skid element according to publication EP-0 204 030. The only difference in the anti-skid element according to this latter publication is the slightly flattened shape of the cross-section. This, again, causes additional problems, since the studs must be mounted in specific positions in holes in the tire tread, making the mounting considerably slower and more expensive.

Publication EP-0 864 449 discloses a passive lamellar non-slip element to be mounted in recesses preformed in vehicle tire tread pattern segments, the tire having a plurality of these segments, both in succession in the rolling direction and in the direction transverse thereto. The lamellar non-slip elements are composed of a strong and hard material and their shape comprising a stem portion towards the tire tread and a flange-like basal portion towards the tire body and an individual lamellar non-slip element being always within one pattern segment. The lamellar non-slip element is substantially lamelliform in shape, and the total thickness of the stem portion of the non-slip element in the orientation of the tire tread is at maximum approximately one-third, and preferably within the range of $1/4$–$1/20$, of the width of the stem portion. The basal portion is wider than the stem portion and/or separated from the stem portion by a neck portion, the greatest thickness of the basal portion being at maximum five times the total thickness of the stem portion, and further the basal portion is substantially straight in the orientation of the width in order to provide tiltability of the lamellar non-slip element. The recesses, which are molded in the tire tread segments have substantially the same inner form as the outer configuration of the non-slip element allowing an effective tilting in a direction transverse to said width of the element. When the car is braked or accelerated, the deformation of the tire rubber causes the lamellar anti-skid elements to tilt, whereupon its gripping to the road is enhanced by the face of the element contacting the road surface. When the tire is rolling at a constant speed, there is either no contact or only very slight contact between the non-slip element and the road surface. This non-slip element is very lightweight, especially when compared to studs of WO-96/28310 and EP-0 204 030. The gripping of the non-slip element to the icy road is effective and the wear of the road surface is very low. As drawbacks are to be mentioned, that it has been noticed damages in the tire tread after a shorter or moderate mileage and/or under driving with a higher speed. Also these lamellar non-slip elements seem to broke or wear too rapidly after taking into use.

OBJECTS AND SUMMARY OF THE INVENTION

It is an object of the present invention to provide an anti-skid stud having a weight considerably smaller than the maximum weight permitted by the regulations. A second object of the invention is an anti-skid stud which would remain as well as possible attached to the tire tread also when the tire tread wears during use. A third object of the invention is to provide an anti-skid stud and a tire providing both good longitudinal grip and good transverse grip between the tire and the road, and at the same time causing as little abrasion of the road surface and as little tire noise as possible during driving. A fourth object of the invention is an anti-skid stud, which has a good endurance/dura-bility.

The studs shall also have a compact structure, i.e. the anti-skid studs do not include elements movable relative to each other, and thus it is ensured that the studs will function also at the end of the life cycle of the tire and the stud. A sixth object of the invention is such a vehicle tire, in which the studs may be symmetric with regard to their central line, enabling the studs to be placed in the tire in any position. A seventh object of the invention is a vehicle tire to be fitted with studs providing a first-rate endurance/durability. A general object of the invention is an anti-skid stud and a tire in which these studs could be inserted so as to provide possibility to tailored driving and anti-skid properties. The manufacturing costs of the studs and the tire should be low, and further the mounting of the studs in holes preformed in the tread pattern blocks of the tire should be simple.

The problems described above can be solved and the objects defined above can be achieved by lamellar anti-skid studs and a tire provided with stud holes according to the invention. According to the first aspect of the invention the vehicle tire comprises a tire carcass and side walls; at least one layer of rubber forming a tire tread with a tread surface on top of the carcass; a tread pattern in said rubber layer comprising a plurality of blocks at least in the circumferential direction of the tire and separated by grooves; anti-skid stud holes within at least some of said blocks, said anti-skid stud holes having a generally circular cross-sectional form; lamellar anti-skid studs in said stud holes, said lamellar studs comprising a stem portion and a basal portion, which is wider than the stem portion and/or separated by a neck portion from the stem portion, the total thickness of said lamellar studs being at maximum one-third of the width of said lamellar studs in the orientation of said tread; and the diameter of said circular stud holes is substantially smaller than the width of said lamellar studs.

The most essential advantage of the invention is that the mass of the lamellar anti-skid stud according to it is considerably less than the maximum weights currently permitted for studs. At its best, the lamellar anti-skid stud according to the invention has a weight only approximately one-half of the maximum weight permitted by current official regulations, or possibly only ⅓–⅕ of the weight of the studs according to the reference publications described above. Another advantage of the invention is that the end face of the lamellar anti-skid stud remains, even during the wearing of the tire, close to its original position, i.e. close to the tread surface, in which case the remains well attached to the tire, and a continuously small rolling resistance lamellar anti-skid stud and low tire noise are obtained for the tire. The wear of the road surface will also remain very slight. A third advantage of the invention is that, when a lamellar anti-skid stud according to it is used, the longitudinal grip and transverse grip of the tire can be proportioned in a desired manner, and the grip of the tire will be good in different situations and on different road surfaces. A further advantage is that the flat lamellar anti-skid studs can be mounted in the circular stud holes in any position so that the width of the stud is oriented either transverse to the rolling direction of the tire or in line with the rolling direction or in any direction therebetween. All lamellar studs in a tire can have the same orientation or different orientations. A special advantage is that is not needed to produce different tires with stud holes for these alternative stud orientations, but the orientations of anti-skid studs are created when inserting the studs in the holes. So the longitudinal grip and transverse grip of the tire can be adjusted for different needs and purposes using the same basic tire and the same type of stud during mounting of studs. It is preferred that the layout or a selection of layouts, that is the orientation of the width of the studs in respect to rolling direction in different areas of the tread, of the studs is/are designed beforehand. The flat lamellar studs stay very firmly on these round stud holes during use and have no tendency to loosen or change their orientation.

According to a second aspect of the invention the vehicle tire comprises, instead of the circular stud holes as disclosed above, stud holes having a generally oval cross-sectional form with a main dimension and a minor dimension, which are transverse to each other and typically perpendicular to each other. The ration of the minor dimension to the main dimension is substantially smaller than the ration between the total thickness and the width of said lamellar studs. This alternative indeed limits the orientations possible for anti-skid studs, but gives protection against incorrect mounting of studs, and so provides a safety precaution. Because the stud holes also in this alternative have a generously rounded form, the tire with mounted studs have the same high endurance/durability as well as all the same other advantages as the embodiment mentioned above.

According to a third aspect of the invention the vehicle tire comprises a cushion disposed at interior end of said stud holes, that is the bottoms of the stud holes are provided with a cushion as described in an earlier patent U.S. Pat. No. 5 800 644. In no case shall the stud holes be so deep, that the bottom thereof reach the carcass of the tire, but there shall always be at least a thin layer of tread rubber forming the interior bottom. The underside of basal portion of the anti-skid studs generally bump at least partly against this cushion either initially or during driving when under pressure of the vehicle in the contact area between the tire and road surface only. Said cushions have a embossed form and may be composed of the one rubber quality of the tread, or preferably, in case the tread comprising a harder base rubber next to the carcass and a more resilient cap rubber on top of the base rubber, of the more resilient cap rubber. In this case the abrasion of the road and tire noise will be still lower than with the inventive tires with studs as described above, owing to the lower penetrating force of the anti-skid studs. The road abrasion and noise properties achieved by this type of tire having stud holes with cushions and fitted with lamellar anti-skid studs are approaching those of tires designed for summer time use, and nevertheless this inventive tire-stud-combination provides excellent grip with icy and or snowy road surfaces.

According to a fourth aspect of the invention the vehicle tire comprises oval or oblong stud holes and generally circular anti-skid studs inserted within said oval stud holes.

The further aspects of the invention are explained and become apparent from the detained description of the various embodiments of the anti-skid stud and various embodiments of stud holes as well as their combinations, as set forth later in this specification.

BRIEF DESCRIPTION OF THE DRAWINGS

FIGS. 1A and 2B depict the first embodiment of the lamellar anti-skid stud according to the invention, from direction I and respectively II in these figures.

FIGS. 2A and 2B depict a second embodiment of the lamellar anti-skid stud according to the invention, from direction III and respectively IV in these figures.

FIGS. 3A and 3B depict a third embodiment of the lamellar anti-skid stud according to the invention, from direction V and respectively VI in these figures. FIG. 3B also depicts an embodiment of the circular anti-skid stud for oval stud holes.

FIGS. 4A and 4B depict a fourth embodiment of the lamellar anti-skid stud according to the invention, from direction VII and respectively VIII in these figures.

FIGS. 5A and 5B depict a fifth embodiment of the lamellar anti-skid stud according to the invention, from direction IX and respectively X in these figures.

FIGS. 6A and 6B depict a sixth embodiment of the lamellar anti-skid stud according to the invention, from direction XI and respectively XII in these figures.

FIGS. 7A and 7B depict a seventh embodiment of the lamellar anti-skid stud according to the invention, from direction XIII and respectively XIV in these figures.

FIGS. 8A, 8B and 8C depict an eighth embodiment of the lamellar anti-skid stud according to the invention, from direction XV, in section XVI—XVI and respectively from direction XVII in these figures.

FIGS. 9A and 9B depict a ninth embodiment of the lamellar anti-skid stud according to the invention, from direction IXX and respectively XX in these figures.

FIGS. 10A and 10B depict a tenth embodiment of the lamellar anti-skid stud according to the invention, from direction XXI and respectively XXII in these figures.

FIGS. 11A and 11B depict the positioning in the resting state of the lamellar anti-skid stud according to the invention and its operation, for example, during braking and respectively during acceleration, in a section through XVIII—XVIII in FIG. 17.

DETAILED DESCRIPTION OF THE PREFERRED EMBODIMENTS

Figure 18:
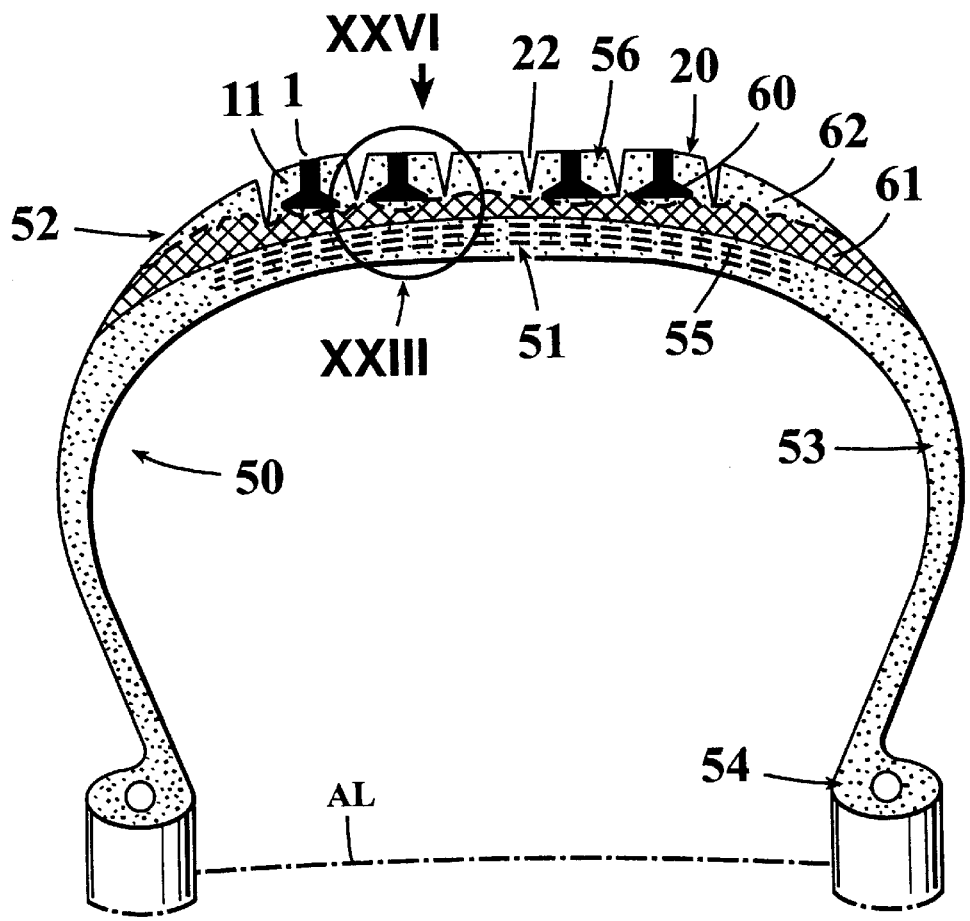
FIG. 18 depicts a schematic cross-section of a vehicle tire elastically fitted with flat lamellar studs in accordance with the invention, along a plane through the axial line of the tire, the tire being provided with elastic cushions under the anti-skid studs

FIG. 18 shows generally a tire 50 elastically fitted with lamellar studs 1 in accordance with the most preferred embodiment of invention. The tire 50 with an axle line AL comprises a carcass 51, including the plies and a nowadays general belt construction 55 imparting shape, strength and tightness to the tire, and a tire shoulder 52 as well as sidewall and bead constructions 53, 54, not shown in detail in the figures, in this respect the tire may be of any new or known type. On top of this tire carcass 51 is a tread 56 consisting of at least one rubber quality and forming a tread surface 20. The tread comprises a surface pattern formed by a plurality of tire blocks 11 and grooves 22, which grooves separate the tread blocks from each other. The surface pattern may further include peripheral ribs and grooves as well as slits and other forms. Actual surface patterns are not shown in the figures, but the pattern may be of any new or known type. The blocks or at least some of the blocks 11 are provided with anti-skid stud holes/recesses 12 extending from tread surface 20 to the inside of the tread. Each anti-skid stud hole has such a depth H3, that the bottom 49 of the stud hole is within the tread rubber and has a spacing outwards from the carcass 51, which means that there is at least a thin layer of rubber between the bottoms 49 and the carcass 51. Typically the depth H3 of the stud holes 11 is at maximum equal with the depth H2 of the grooves 22, or the depth H3 of the stud holes 11 is smaller than the depth H2 of the grooves 22. The tread 56 may conventionally consist of one single relatively hard rubber layer 63 as can be understood from FIGS. 19A and 21A. Preferably the tread 56 consists of a first harder rubber layer 61 facing the tire carcass 51, i.e. a so called "base rubber", and of a second rubber layer 62 of a more elastic material forming the outer part of the tread and the tread surface 20, i.e. so called "cap rubber". This embodiment, in which tread consists of two different rubber layers 61 and 62, is shown in the FIG. 18 as well as in FIGS. 19B and 21B. It is clear that a tire having a tread of only one rubber quality looks generally almost similar in the view of FIG. 18. It is also possible to use more than said two layers of rubber for a tread on top of each other and/or in addition several rubber qualities to form different sections of tread, e.g. the center area of the tread, the shoulder areas of the tread etc.

Figure 17:
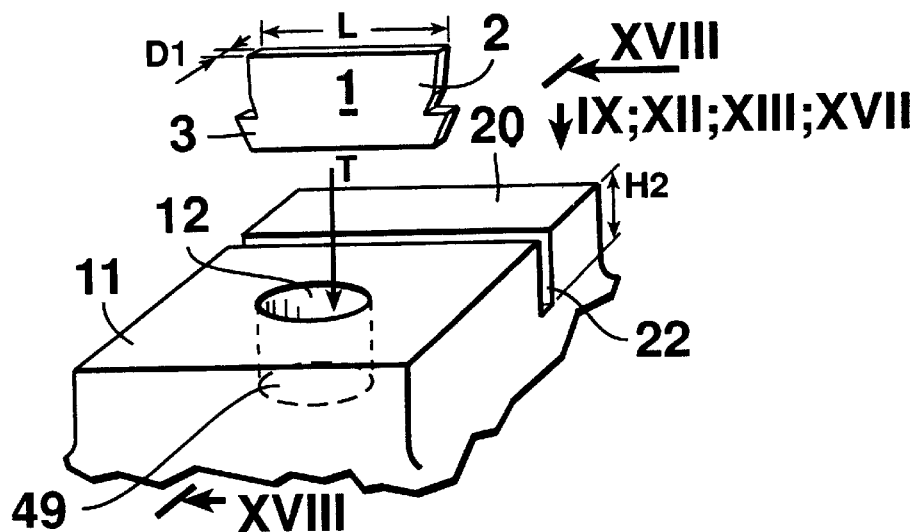
FIG. 17 depicts axonometrically the mounting of a flat lamellar anti-skid stud according to the invention into a circular and straight stud hole in a tread pattern block of a vehicle tire.

FIG. 17 shows an individual tread pattern block 11 having one stud hole or recess 12, produced in connection with the tire manufacture, i.e. a preformed hole/recess. As described above there are a several tread blocks in a tire generally both along the circumferential direction and in the axial direction AL of the tire. At least some of said blocks are provided either with one stud hole or with two stud holes 12. It is also possible to provide several stud holes within an individual block, but it is believed that this latter case is necessary in special cases only. Passive lamellar anti-skid studs 1 according to invention are inserted by pushing into these stud holes or into a selected portion of the stud holes after the manufacture of the tire 10, before the tire is taken into use. In this context, by the passivity of the lamellar anti-skid studs is meant that, when in a tire, they are not moved mechanically, for example pneumatically, by means of a separate power source, between different modes of use, and the lamellar anti-skid studs 1 do not have parts movable one relative to another; instead, the operation of the lamellar anti-skid studs takes place as an interaction among the rubber layer or the rubber layers of the tire, the lamellar anti-skid stud itself, and the road surface when there is a change in speed or a change in direction of the tire relative to the road surface. In this sense of interaction, the lamellar anti-skid stud according to the invention and a vehicle tire equipped with such lamellar anti-skid studs operate dynamically as the position of a lamellar anti-skid stud 1 changes expediently in different driving situations under the effect of a change in speed and/or a change in direction, as is described in greater detail below. The mere centrifugal force of the tire rotation does not have at least primary or substantial significance in terms of the dynamic operation of the lamellar anti-skid stud according to the invention. The lamellar anti-skid studs 1 are made of a strong and hard material, and the shape of the lamellar anti-skid studs comprises one stem portion 2 towards the tread 56 of the tire and one basal portion 3 towards the tire body 51. The total length H1 of the lamellar anti-skid stud according to the invention is, in the conventional manner, at maximum equal to the height H2 of the tire tread pattern block as measured from the bottom of the tire grooves 22 and at the same approximately equal with the depth H3 of the stud hole 12. The lamellar anti-skid stud 1 according to the invention thus has no contact with the tire carcass 51 but is in its entirety situated within the tread pattern block 11.

FIGS. 1A–10B show in greater detail various embodiments of the shape according to the invention of the flat lamellar anti-skid stud 1 according to the invention. According to the invention, the lamellar anti-skid stud is in shape substantially lamelliform, and at least the total thickness D1 of the stem portion 2 of the lamellar anti-skid stud is, in the orientation of the tread surface 20, at maximum approximately one-third of the width L of the stem portion 2 in the orientation of the tread. Thus, when seen in a direction IX, XI, XIII and XVII perpendicular to the tread surface 20, the lamellar anti-skid studs according to the invention seem clearly oblong, as can be seen directly in FIGS. 5B, 6B, 7B and 8C and in FIG. 17. The same can be understood from FIGS. 12, 13 and 14, which thus depict a vehicle tire tread 51 from the outside, in a direction perpendicular thereto. By the total thickness D1 and the width L of the stem portion is meant here the largest outer dimensions of the stem portion of the lamellar anti-skid stud or the area delimited by the outermost points in a direction perpendicular to the length H1 formed by the stem portion and the basal portion of the lamellar anti-skid stud.

In addition, the basal portion 3 of the lamellar anti-skid stud according to the invention is in the main straight in the orientation of the above-mentioned width L. This can be understood, for example, with the help of FIGS. 5A–5B, 6A–6B and 8A–8C, in which the stem portion 2 is not straight in the orientation of the width L but the basal portion 3 is straight and not corrugated or jagged in the manner of the stem portion. More precisely, by this straightness is meant that the basal portion 3 is straight relative to its center line parallel to the width L, or at least symmetrical relative to the central plane 30 parallel to the length H1 of the lamellar anti-skid stud. Thus the basal portion 3 may be, over the extent of the width L, for example, thicker in the middle and thinner at the ends or, vice versa, thinner in the middle and thicker at the ends, or its thickness may vary in the direction perpendicular to the width L in some other manner, expedient in the given case. For example, in the case of FIGS. 3A–3B and 4A–4B, the basal portion 3 can be designed in this manner, oval or hourglass-shaped or in some other shape in the direction of the width L, as long as it is approximately symmetrical relative to the center plane 30 parallel to the length H1 of the lamellar anti-skid stud. In the direction of the length Hi, however, the basal portions may be asymmetrical, as can be seen, for example, in FIG. 1A and 9A–9B. In any case, even if the basal portion 3 were slightly curved or tortuous over the width L dimension, this curvature or tortuosity should in any case be substantially less than the deviation of the curves of the stem portion from the straight line or plane over the width L dimension. In addition, the basal portion 3 of the lamellar anti-skid stud according to the invention is designed moderately thin, especially in the orientation of the lamellar anti-skid stud thickness D1, D2 perpendicular to the width L. For this purpose, the thickness of the basal portion in the orientation of the tread surface 20 is in certain embodiments, which are shown in FIGS. 1A–2B, 7A–8B and 10A–10B, substantially equal to the material thickness D2 of the stem portion 2. In another embodiment, shown in FIGS. 6A–6B, the thickness K6 of the basal portion has been designed greater than the material thickness D2 of the stem portion, but smaller than the total thickness D1 of the stem portion. In certain other embodiments, shown in FIGS. 3A–5B, the thickness K2, K3, K6 of the basal portion in the orientation of the tread surface 20 is greater than the total thickness D1 of the stem portion. In FIGS. 9A–9B the thickness K7 of the basal portion in the orientation of the tread surface 20 is smaller than the total thickness D1 of the stem portion. However, the thickness K2, K3, K6 of the basal portion in the orientation of the tread surface 20 is in any case smaller than five times the total thickness D1 of the stem portion. Typically this thickness is at maximum four-fold, and preferably at maximum three-fold, as compared with the total thickness of the stem portion. In many cases the usable basal portion thickness K2, K3, K6 is, for example, 120%, 130% or 220% of the total thickness of the stem portion, as shown in FIGS. 3A–5B. The purpose is to give the basal portion a shape which permits the tilting of the lamellar anti-skid stud without damaging and wearing the tire rubber but which prevents the lamellar anti-skid stud from becoming detached. In order to ensure tilting and to reduce the wear of the holes for lamellar anti-skid studs in the tire, at least those embodiments of the lamellar anti-skid stud in which the basal portion thickness K2, K3, K6 is greater than the total thickness D1 of the stem portion, and in which the basal portion thus constitutes a bulge 4c, 4d transverse to the width L of the lamellar anti-skid stud, the edges of this bulge are rounded. In general it is advisable to make the rounding greater the greater the bulge thickness K2, K3, K6.

The great rounding evident in FIGS. 3B and 4B, its radius corresponding to approximately one-half of the vertical dimension of the bulge in the orientation of the height HI of the lamellar anti-skid stud, is one preferred embodiment. It is clear that the radius of the rounding may also be smaller, for example 30% or 20% of the said vertical dimension of the bulge, especially in the embodiment of FIG. 3B, but also in the embodiment of FIG. 4B. If the bulge thickness is clearly greater than in these figures, for example of the order of the maximum dimensions mentioned above, it is in general preferable to use higher values for the radius of the rounding, 30% and 50% of the said vertical dimension. Generally it is preferred that the total thickness K2, K3, K6 and K7 or D2 of the basal portion 3 is at maximum one third of the width K1, K4 and K5 of the basal portion or within the range of ¼–1/20 of the basal portion width, and typically of the order of ⅕–1/15 of the width K1, K4 and K5 of the basal portion 3. This means that the relationship between the thickness and width of the basal portion is like the relationship between the thickness and width of the stem portion as described below, but not necessarily the same in a type of flat lamellar stud.

Figure 12:
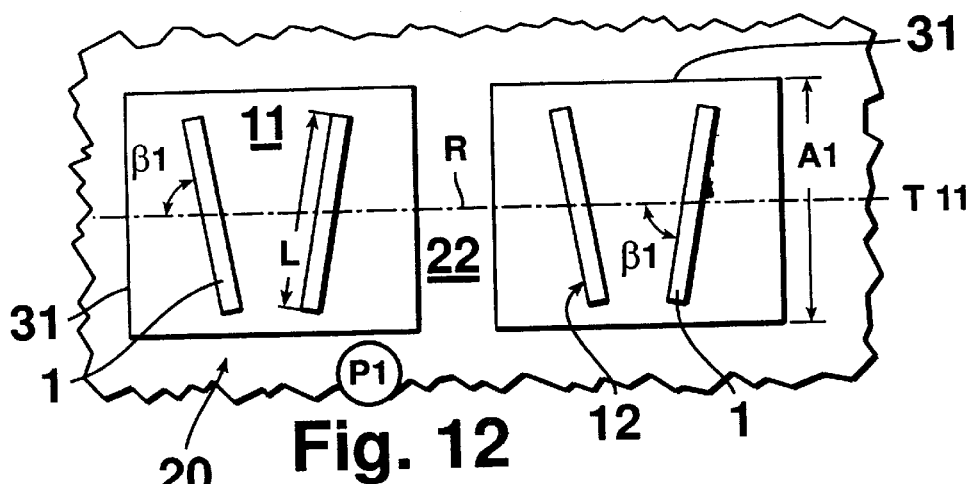
FIG. 12 depicts one positioning of the lamellar anti-skid studs according to the invention in the pattern blocks of a tire, as seen in a direction perpendicular to the tread surface, from the same direction as FIG. 14.
Figure 13:
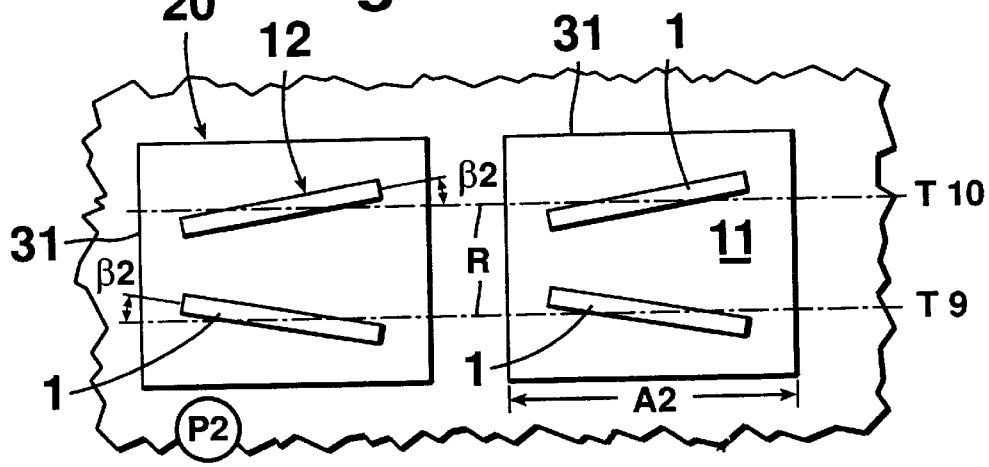
FIG. 13 depicts another positioning of the lamellar anti-skid studs according to the invention in the pattern blocks of a tire, as seen in a direction perpendicular to the tread, from the same direction as FIG. 14.
Figure 14:
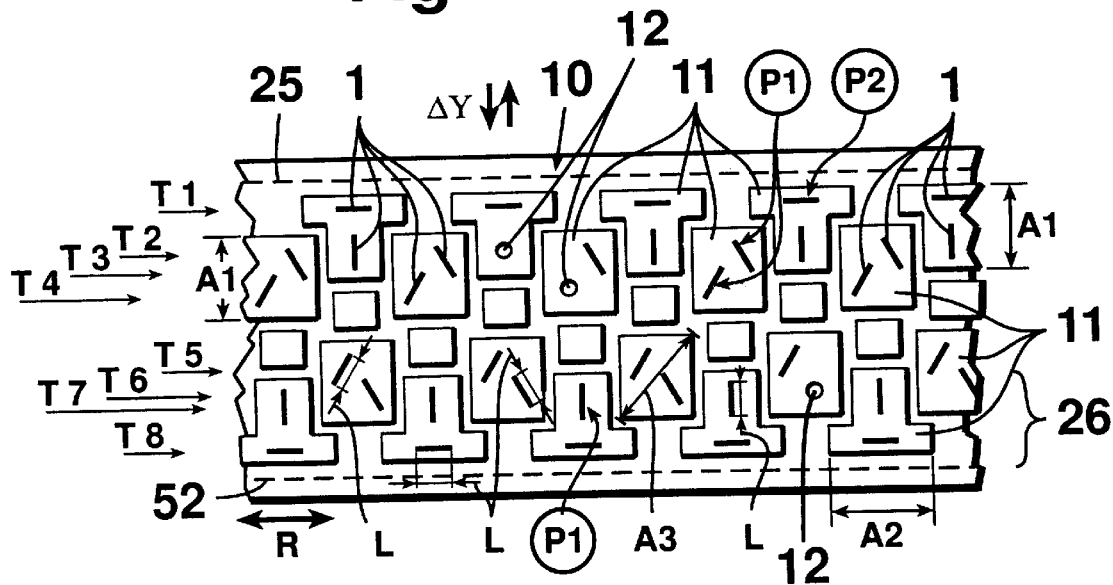
FIG. 14 depicts an overall picture of a vehicle tire tread with lamellar anti-skid studs according to the invention positioned in different ways in different pattern blocks, from direction XXVI in FIG. 18.

However, the greatest width L or K1, K4, K5 of the lamellar anti-skid stud 1 according to the invention, described above, is substantially smaller than the width A1 of the tread pattern block 1 in a direction perpendicular to the rolling direction R of the tire, when the lamellar anti-skid stud is placed at least in the main in an orientation transverse to, or at only a small angle β1 to, this rolling direction, as is shown in FIGS. 12 and 14. Respectively, the above-mentioned great width L of the lamellar anti-skid stud 1 is substantially smaller than the width A2 of the tread pattern block in the tire rolling direction R, when the lamellar anti-skid studs have been positioned to be approximately parallel to the rolling direction R or at only a small angle β2 relative to it, as shown in FIGS. 13 and 14. In can be stated in general that this width L of the lamellar anti-skid stud is always smaller than the width A3 of the tread pattern block in the orientation in which the width L of the lamellar anti-skid stud mainly settles, as is indicated in FIG. 13. In other words, the lamellar anti-skid stud according to the invention is always within one tread pattern block 11 and does not extend to its vertical edges 31 which form the sides of the grooves 22 separating the tread pattern blocks.

As was stated above, the stem portion 2 of the lamellar anti-skid stud according to the invention may be straight SI over the dimension of its width L, as shown in FIGS. 1A–4B, 7A–7B and 9A–10B. Alternatively, the stem portion 2 may also be corrugated or jagged S2 over the dimension of its width L, as shown in FIGS. 5A–6B and 8A–8C. This corrugation S2 may be wave-like, i.e. rounded, as can be seen in FIG. 8C, but it may also be more angular in a jagged manner, as can be seen in FIGS. 8B and 6B. The extent, i.e. depth P, of the corrugation or jaggedness may be substantially constant over the entire height H1* of the stem portion 2; such a case is shown in FIGS. 5A–5B. Alternatively, the corrugation or jaggedness may decrease gradually from the end face 6 towards the lower edge of the height H1* of the stem portion, as is shown in FIGS. 6A–6B and 8A–8B. The number of waves or teeth in the stem portion of a lamellar anti-skid stud according to the invention may be two or more. Thus, FIG. 6B shows a situation in which there are two teeth, FIG. 5B shows a situation with three angular corrugations, and FIGS. 8A–8C a case with eight curved corrugations. The use of corrugations or teeth increases the rigidity, strength and thereby also the functioning of a lamellar anti-skid stud 1 according to the invention, made of a thin material with thickness D2. The braking grip, acceleration grip and lateral grip also increase in this case. Furthermore, the stem portion may be equipped with notches or grooves 7 extending from the end face 6 towards the basal portion 3, in which case the stem portion is divided S3 into several sections. These sections may be in the same plane parallel to the stem portion width L, as shown in FIG. 4A and 7B, or they may be otherwise jagged as shown in FIGS. 5B and 6B except that between the jagged sections there are the above-mentioned notches 7. The cross-section of the lamellar anti-skid stud 1 according to the invention in the orientation transverse to its length Hi may also be a flat oval, a flat hourglass or a shape resembling these, thus, generally some lamelliform shape.

The total thickness D1 of the stem portion 2 of the lamellar anti-skid stud 1 is, as already pointed out above, at maximum one-third of the width L of the stem portion; preferably this total thickness is within the range of ¼–1/20 of the stem portion width L discussed above, and typically of the order of ⅕–1/15 of the stem portion width L. The embodiments depicted in the figures show ratios D1:L which are approximately 1:3.8 in FIGS. 5A–6B, 1:6.5 in FIGS. 8A–8C and 10A–10B, 1:3 in FIGS. 3A–3B and 9A–9B, 1:8 in FIGS. 2A–2B and 4A–4B, and 1:9 in FIGS. 1A–1B and 7A–7B. It is clear that the total thickness D1 may be made thinner in proportion to the stem portion width L than shown in the figures, because in the figures it has been necessary to take into account the clarity of the presentation. In particular, when a relatively high ratio D1/L is used, as in FIGS. 5A–6B and FIGS. 8A–8C, it is in general advantageous to use in the lamellar anti-skid stud a material, the material thickness D2 of which is smaller than the total thickness D1, whereupon the thickness exceeding the hard material thickness D2 may be another type of material. So the hard material with a thickness D2 is embedded e.g. within a material having a lower density, which provides a more lightweight stud. This kind of lamellar stud construction is described in more detail later in this text. It must be understood that, for example, in the embodiments according to the figures, any of the shapes shown, or a combination of the shapes shown can be implemented with dimensions deviating from those in the figures.

In order to keep the lamellar anti-skid stud 1 according to the invention in place and to prevent it from becoming detached from its hole 12 in the tread pattern block 11, the lamellar anti-skid stud has in the basal portion 3 widenings, or bulges 4a ... 4f of a kind. FIGS. 1A–2B show bulges 4a and 4b, FIGS. 7A–8C and 9A–10B show bulges 4a, 4b and 4f, which project from the stem portion 2 or the neck portion 5 of the lamellar anti-skid stud only in the orientation of its width L. In these cases the thickness of the bulge 4a, 4b and 4f of the basal portion is thus the same as the thickness D2 of the material of the lamellar anti-skid stud. FIGS. 3A–4B depict an embodiment according to the invention wherein the basal portion bulges 4c and 4d project from the stem portion 2 only in the orientation of the total thickness D1 of the lamellar anti-skid stud. In these cases the bulge 4c, 4d of the basal portion does not project at all from the stem portion in the orientation of its width but only in the orientation perpendicular thereto, in which case the bulge thickness is greater than the thickness D2 or minimum thickness D3 of the stem portion material. FIGS. 5A–5B and 6A–6B show cases in which the bulge 4e of the basal portion 3 projects from the stem portion 2 in the orientations of both the width L of the lamellar anti-skid stud and its total thickness D1. In FIGS. 5A–5B the thickness of the bulge 4e is greater than the thickness D2 of the stem portion material and greater than the total thickness D1 of the stem portion, whereas in FIGS. 6A–6B the thickness of the bulge 4e is greater than the thickness D2 of the stem portion material and smaller than the total thickness D1 of the stem portion. The bulges 4b, 4d, 4e and 4f of the lamellar anti-skid stud are designed so that the maximum dimension K1, K2, K3, K6 of the bulge is greater than the maximum width L of the stem portion or the maximum thickness D1 of the stem portion or the thickness D2 of the stem portion material. These embodiments are shown in FIGS. 2A–2B, 4A–4B, 5A–7B and 9A–10B. Alternatively, the lamellar anti-skid stud may have a neck portion 5 between the bulge 4a, 4c, 4e and 4f and the stem portion 2, in which case the extent K5 of the bulge at least in the said orientation, i.e. the orientation of the width L of the lamellar anti-skid stud, may be approximately equal to the width L or the total thickness D1 of the stem portion or deviate from that. These embodiments are shown in FIGS. 1A–1B, 3A–3B and 5A–6B as well as 10A–10B. Both of these designs can be combined, as has been done in the embodiment according to FIGS. 7A–7B, in which the bulge 4f both is greater in its extent K4 than the width L of the stem portion and is additionally separated by a neck portion 5 from the stem portion 2.

The width L of the stem portion 2 of the lamellar anti-skid stud, according to the invention, of the shape described above is within the range of 3 mm–20 mm and its total thickness D1 is within the range of 0.5 mm–3 mm. The material thickness D2 of the stem portion 2, or possibly also of the basal portion 3, of the lamellar anti-skid stud according to the invention is of the same order, 0.5 mm–3 mm. The length H1 of the lamellar anti-skid stud 1 is within the range of 5 mm–15 mm. The ratio of the total thickness D1 of the stem portion of the lamellar anti-skid stud to the total length H1 of the lamellar anti-skid stud, i.e. D1:H1, is at maximum 0.4 and preferably at maximum 0.25, and typically smaller than 0.2. Furthermore, the width of the basal portion bulge 4a may be 95%–110% of the stem portion width L, i.e. approximately equal to the stem portion width, as in FIGS. 1A and 8A, or 150% 180% of the stem portion width L, as the width of the bulge 4f and 4b in FIGS. 7A, 2A and 9A. The thickness of the basal portion bulge, in turn, may be 40%–50% of the total thickness D1 of the stem portion, as in FIGS. 6B and 8B; or 100% of the total thickness D1 of the stem portion, i.e. approximately equal to the total thickness of the stem portion, as in FIGS. 1B, 2B and 7B; or 120%–220%, as in FIGS. 3B, 5B and 4B. The bulge or widening can also be in one orientation either in that of the thickness, like the dimension K7 in FIG. 9B, or in that of the width smaller than the dimension of the stem portion in the respective orientation.

As can be seen from the above values, the width L of the stem portion 2 of the lamellar anti-skid stud according to the invention is of the same order as the diameter or dimension of the conventional prior-known studs. Since the total thickness D1 of the stem portion of the lamellar anti-skid stud according to the invention is, in the manner described above, at maximum one third of this width L, and since the length H1 of the lamellar anti-skid stud according to the invention is of the same order as the lengths of conventional studs, it can be understood directly that the weight of the stud according to the invention is considerably smaller than the weight of any conventional stud the cross-section of which in the orientation of the tire tread is usually round, possibly approximately square. Even if the width L of the stem portion of the lamellar anti-skid stud according to the invention were made clearly larger, for example, one and a half times or twice the diameter or dimension of prior known studs, owing to the small total thickness D1 of the stud according to the invention and its possibly even smaller material thickness D2, studs clearly lighter in weight than prior known stud structures would be arrived at. Thus it can be noted that, for a passenger car, the lamellar anti-skid stud according to the invention weighs at maximum approximately 1 g, and typically at maximum 0.8 g. Preferably the weight of a lamellar anti-skid stud for passenger cars is at maximum 0.7 g, but even a weight of 0.5 g is fully realistic. Quite correspondingly, for the tires of a van, the lamellar anti-skid stud according to the invention weighs at maximum approximately 2 g and typically at maximum 1.6 g. Preferably the lamellar anti-skid stud according to the invention weighs at maximum 1.4 g, and in this case also a weight of 1 g can be achieved. For truck tires, the lamellar anti-skid stud according to the invention weighs at maximum approximately 3 g and typically at maximum 2.5 g. Preferably the weight of such a lamellar anti-skid stud according to the invention is approximately 2.1 g, and the achievable weight is of the order of 1.5 g. Thus the lamellar anti-skid stud according to the invention is in every situation at least 10–20% lighter in weight, and usually 20–40% lighter, than a prior known stud intended for the corresponding use. As can be noted from the above, it is also possible to achieve weights which are of the order of one-half of the weight of prior-known, currently used studs. It is clear that a lamellar anti-skid stud weight this low reduces tire noise as well as road wear to a truly considerable degree.

The lamellar anti-skid stud 1 according to the invention, of the shape described above, can be manufactured from materials of a plurality of different types. A ceramic material, generally called as a "cermet" is the most preferred type of hard, wear resistant material. A cermet material is, for example, a sintered mixture of an oxide, a nitride, a carbide, a boride, a silicide, a mixture or complex compounds thereof, and a binder. A cermet material so is a composite material, in which said oxide, nitride, carbide, boride, silicide, mixture or complex compounds thereof forms the reinforcing component and said binder the matrix material. The most conventional cermet material is the cemented carbide in which the reinforcing phase is substantially tungsten carbide (WC) and the binder material is cobalt (Co) are here regarded as composite materials. In general, the reinforcing component is a carbide of Group IVB, VB or VIB metals. In addition to tungsten carbide titanium carbide (TiC) would be practical because of its low density, 4.9 g/cm$^3$, but it is generally considered brittle. Further niobium carbide (NbC) offers lower density, 7.8 g/cm$^3$, than tungsten carbide, as well as do chromium carbide ($Cr_3C_2$, $Cr_7C_3$) with 6.7 g/cm$^3$ and zirconium carbide (ZrC) with 6.5 g/cm$^3$.

Also boron nitride (BN) with a cubic lattice, aluminum nitride (AlN), silicon nitride ($Si_3N_4$) might find use as a hard wear resistent component. In addition to cobalt other metals like iron (Fe), nickel (Ni) and molybdenum (Mo) etc. or their alloy can be used as the binder, depending of their wetting properties in respect to the carbide, nitride, boride, oxide and/or silicide constituent, which provide the hardness and wear resistance properties of the stud material. The content of the binder can deviate from the ordinary amount of 5–10% up to 60% depending of the reinforcing component and the type of binder alloy. Of course the reinforcing component and/or the binder can include further alloying elements, the latter having optionally also different phases to offer various material properties needed. The reinforcing phase may be in the form of particles of different shapes or they may be in the form of fibres. Generally the particle size of the carbides varies between 0.01 $\mu$m and 10 $\mu$m. Of some materials, so-called whiskers can be used as the reinforcing phase. A sintered cermet material being a combination of at least TiC and NbC as a reinforcing component, and at least Ni and Mo as a binder is found practical for the purposes of the invention. It is also possible to utilize so called solid solution carbides, borides and nitrides, like $(Ti,Mo)C_{1-x}$, WC—TiC—Ta(NbC), WC—Ti, $(Ti,Mo)(C,N)_{1-x}$ etc., which do not contain a separate binder. Complex carbides, borides and nitrides are also known, like TiSC, $Cr_2AlC$, $Mo_3Al_2C$, TaN(HfN)—TaC(HfC) or TaN—$ZrB_2$ etc., which might be useful, too. Of the said matrix materials and reinforcing phase materials it is possible to form a large number of different combinations, from among which a combination suitable for the material of a lamellar anti-skid stud according to the invention can be found. In a composite material the reinforcing phase and the matrix material binding it are at least approximately evenly distributed as such. If the reinforcing phase used is fibers or whiskers, it is expedient to arrange them in a lamellar anti-skid stud according to the invention in the orientation of its length H1.

The lamellar anti-skid stud according to the invention can be formed in the manner of a laminate also so that a strong and hard lamelliform piece of material, as defined above, either substantially of one or two dimensions of the lamellar anti-skid stud or slightly smaller, is e.g. cast within a plastic mantle or a metal alloy mantle, which forms the final shape of the outer surface of the lamellar anti-skid stud. In such a case the outer form and dimensions of the final lamellar anti-skid stud shall be as defined earlier in this text. FIGS. 3A and 3B illustrate such an embodiment, in which the hard and wear resistant piece 40, composed of one of the cermet materials described above, mounted inside the mantle 41 being indicated by a dotted line. As can be seen in the FIG. 3B, by the mantle 41 there are provided only parts, such as bulge 4c and the top enlargement 4*, which ensure that the lamellar anti-skid stud will remain attached to the tire. It is generally advantageous that said hard and wear resistant piece 40 is a plate like element with substantially even thickness and the mantle forms the outer configuration of the lamellar stud 1. Here it must be taken into account that e.g. in the embodiments of FIGS. 5A–6B and 8A–8C it is possible to use a mantle which fills up the depressions between the teeth or corrugations, for example dimension P in FIG. 5B. In this case the thickness of the mantle, of course, varies considerably, but its thickness is anyway small. This kind of embodiment is most practical in cases, where outer configuration is strongly different in different areas of the lamellar stud, and especially in the orientation of the thickness thereof.

The lamellar anti-skid studs 1 according to the invention can be positioned in the tread pattern blocks 11 of a vehicle tire 50 in many different ways, in which case the desired longitudinal grip properties, lateral grip properties and other driving properties and operation of the tire can be obtained. These are illustrated in FIGS. 12–16B. In order to achieve sufficient grip during acceleration, and at least sufficient grip during braking, at least some proportion, i.e. usually a substantial proportion, of the lamellar anti-skid studs according to the invention in the tire 50 are in position P1, wherein their width L is transverse to the tire rolling direction R. In the tread pattern shown schematically in FIGS. 14 and 15A–16B there are two lamellar anti-skid stud rows T2 and T7 and a third lamellar anti-skid stud row T12, in which the lamellar anti-skid studs are perpendicular to the tire rolling direction R. FIG. 12 depicts a modification of this situation, the width L of the lamellar anti-skid studs forming a substantial angle $\beta$ to the rolling direction R. This angle $\beta 1$ between the width L of the lamellar anti-skid studs and the rolling direction R is at least within the range of 45°–90°, but is typically within the range of 70°–90°, as in FIGS. 12 and 14. Furthermore, preferably in a tire according to the invention also a certain proportion of the lamellar anti-skid studs 1 in a tire 50 are in position P2, in which their width L is substantially longitudinal in relation to the tire rolling direction R. Such a situation is depicted in the tread patterns of FIG. 14 in lamellar anti-skid stud rows T1 and T8, as well as in FIG. 13 in lamellar anti-skid stud rows T9 and T10. In the case of FIG. 14, the length L of the lamellar anti-skid studs is parallel to the rolling direction R, whereas in the case of FIG. 13 the width L of the lamellar anti-skid studs forms a rather small acute angle $\beta 2$ to the rolling direction R. The angle $\beta 2$ between these lamellar anti-skid studs in longitudinal positions P2 and the rolling direction is at least within the range of 45°–0°, but typically within the range of 20°–0°, as shown in FIGS. 14 and 13. In this context it is pointed out that both angle $\beta 1$ and angle $\beta 2$ are that angle between the lamellar anti-skid stud width L and the rolling direction R which is the smaller one of the angles formed by crossing, as indicated in the figures. This longitudinal position P2 defined above provides more lateral grip for the tire, i.e. grip in directions transverse to the rolling direction R.

In a vehicle tire the numbers of lamellar anti-skid studs 1 and the positions of their widths L in relation to the tire rolling direction R are always arranged so that a longitudinal grip and a lateral grip evenly distributed over the length of the circumference are provided in the tire. In this case the lamellar anti-skid studs are normally situated evenly distributed over the circumference. One possibility to produce the above-mentioned homogeneous grip is to arrange the lamellar anti-skid studs in a plurality of rows in the rolling direction, i.e. in the direction of the circumference of the tire, the rows being located adjacently in the direction perpendicular to the rolling direction R, either completely separate from one another or partly interlaced. FIGS. 12–16B show such rows T1–T12 of lamellar anti-skid studs 1. Rows T1, T8 and T12 are non-interlaced relative to the other rows. Rows T2, T3 and T4, and respectively rows T5, T6 and T7, are mutually somewhat interlaced. Rows T9 and T10 are clearly separate from each other, but parallel in the manner defined relative to the rolling direction R. In each of the said rows T1–T12 either the lamellar anti-skid studs are substantially in the same position relative to the rolling direction or the lamellar anti-skid studs form the same angle $\beta 1$ or $\beta 2$ to the rolling direction. In each of the rows T1–T8, all of the lamellar anti-skid studs 1 are in the manner defined above in the same position relative to the rolling direction, whereby there thus forms a row of lamellar anti-skid studs in the same position on the circumference of the tire 50. In the case of FIG. 12, in row T11 the length L of the lamellar anti-skid studs forms an angle β1 of the same magnitude to the rolling direction R, and in the case of FIG. 13, in rows T9 and T10 the length L of the lamellar anti-skid studs forms an angle β2 of the same magnitude to the rolling direction R. However, the different lamellar anti-skid studs are in different positions, of which there may in this case be two different types, as can be seen in FIGS. 12 and 13. It is preferable that these two different positions, having the same angle β1, β2, alternate systematically over the entire length of the tire circumference. Usually it is preferable to provide lamellar anti-skid studs 1 in a longitudinal position P2 in the area of the tire shoulder 52 or in the tread area 26 adjacent to it. The lateral grip can be thereby improved. Lamellar anti-skid studs in a lateral position P1 can be placed not only in the area of the tire shoulder 52 or the area 26 close to it, but also towards the middle of the tire, whereby a good braking grip is achieved. Owing to its light weight and its small or non-existent penetrating force during normal, constant driving, the lamellar anti-skid stud according to the invention can be used in a location considerably closer to the center line parallel to the rolling direction than can conventional studs. This further improves the grip of a tire equipped with studs according to the invention.

Figure 15A:
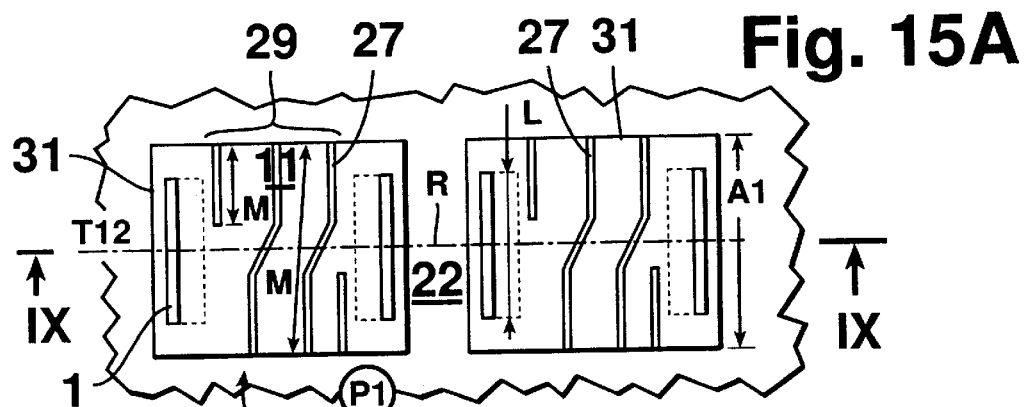
FIG. 15A depicts a third positioning of the lamellar anti-skid studs according to the invention in the pattern blocks of a tire, as seen in a direction perpendicular to the tread, from direction XI in FIG. 15B.

In the tread pattern blocks the lamellar anti-skid studs 1 can be placed vertically so that in the resting state, in which the tire is stationary or rolling at constant speed, the length Hi of the lamellar anti-skid studs is perpendicular to the tread surface 20. This position is shown in FIGS. 11A–11B, and in this case there may be one, two or more lamellar anti-skid studs in a pattern block and their site within the area delimited by the tread pattern block dimensions A1–A3 may be any desired or planned site. On the other hand, in tread pattern blocks 11 the lamellar anti-skid studs 1 may be placed in a slanted position so that in the resting state the length Hi of the lamellar anti-skid studs forms an angle χ to the normal to the plane of the tread surface 20 in a plane perpendicular to the width L. This position is depicted in FIGS. 15A–16B, and in this case there are typically two lamellar anti-skid studs in a tread pattern block 11, and these two lamellar anti-skid studs are located within the area limited by the dimensions A1–A3 of the pattern block, close to the opposite edges 31 of the pattern block. In particular, the lamellar anti-skid studs are in the resting state tilted at angle χ in such a manner that the basal portions 3 of the lamellar anti-skid studs are closer to each other than the stem portions, and respectively the stem portions 2 and the end faces 6 are farther away from each other than the basal portions. If in this embodiment the lamellar anti-skid studs are placed asymmetrically, the slant can be defined so that the stem portions 2 and the end faces 6 are farther away from the central parts 29 of area A1–A3 of the tread surface 20 of the pattern block 11. This angle χ is according to the invention within the range of 3°–45° in magnitude, and preferably smaller than 30°. However, typically angle χ is greater than 5° or 10°. Thereby the projection increase Q of the lamellar anti-skid stud is made more effective, as described below. In addition, it is advantageous if the pattern block 11 hag, between the lamellar anti-skid studs on the edge, i.e. in the central parts 29 of the pattern block, one or more narrow slits 27, which are substantially narrower than the grooves 22 between the pattern blocks. The slits 27 are so narrow that their edges, during the movement of the tire, at least at times bear on each other, which is not done by the grooves 22. The length M of the slits is at least in part parallel to the width L of the lamellar anti-skid studs or, alternatively, at least substantially parallel to the width L of the lamellar anti-skid studs. In FIG. 15A the central slits 27 are partly parallel, but in the main non-parallel, to the width L, whereas in FIG. 16A the slits 27 are substantially parallel to the width L of the lamellar anti-skid stud. The slits 27 may extend over the entire pattern block or over only part of its dimensions A1–A3. Possibly the pattern block 11 may also have an edge bevel 28, which connects the vertical edge 31 and the tread surface 20. The edge bevel 28 may end approximately at that point of the tread surface 20 where the stem portion 2 of the lamellar anti-skid stud meets the tread and where thus the end face 6 is situated.

The operation of a lamellar anti-skid stud 1 according to the invention is described below with the help of FIGS. 17 and 11A–11B and 15B and 16B. The positions of the pattern block and the lamellar anti-skid stud in the resting state, i.e. when the vehicle tire either remains stationary or moves at constant speed, have been drawn with solid lines in FIGS. 11A, 11B and 15B, 16B. The positions of the pattern block and the lamellar anti-skid stud during acceleration or braking, i.e. when a change in speed αR or respectively a change in tire direction AY prevails, are indicated with dotted lines in FIGS. 11A, 11B and 15B, 16B. It is to be understood that AR has effect primarily in the rolling direction R, in which case FIGS. 11A, 11B and 15B, 16B relate to lamellar anti-skid studs in a position P1 transverse to the rolling direction and that the change in direction ΔY means a lateral grip situation of the tire, in which slipping Y or a tendency to slip has effect in a direction transverse to the rolling direction, in which case FIGS. 11A, 11B and 15B, 16A concern lamellar anti-skid studs in positions P2 parallel to the rolling direction.

In the resting state, i.e. after mounting and when the tire is either not rotating or is rotating at constant speed, the length H1 of the lamellar anti-skid studs is, according to one embodiment of the invention, substantially perpendicular to the tire tread surface 20, as is indicated in FIGS. 11A–11B. Likewise in this resting state, even if the weight of the car is not bearing on the tread, the end face 6 of the lamellar anti-skid stud 1 is approximately in the same plane as the tread surface 20. In any case, in this situation the projection of the end face of the lamellar anti-skid stud from the tread surface 20 of the tire is substantially below 1 mm, and most commonly substantially below 0.5 mm and, as was already noted above, typically in the same plane as the tread surface 20. When the car is either accelerated or braked, whereupon a longitudinal force or skidding ΔR is produced, or if, respectively, the car is driven along a curve, whereupon a transverse force or skidding ΔY is produced, both the pattern blocks 11 and the lamellar anti-skid studs 1 according to the invention tilt in the manner shown by dotted lines in FIGS. 11A and 11B. Thereupon, as far as is known, one or both of the following phenomena will occur. At that end of the stem portion of the lamellar anti-skid stud which includes the end face 6 there is produced an effective projection increase Q, which, when pushing into the road surface, causes an increase in the tire grip. Another effect is that the end face 6 of the lamellar anti-skid stud 1 tilted to an angle of α1 or respectively α2 impinges against the road surface and thereby causes deceleration even if there is no projection increase Q. According to the present-day conception, both of these phenomena do occur, although the effect of the projection increase Q is most likely greater. With this mechanism, during constant driving the vehicle tires behave as tires without lamellar anti-skid studs, but whenever the speed or the direction is changed, the lamellar anti-skid studs are activated, having at least the same effect as have prior known studs in a tire. Thus the studs according to the present invention are active only when, and exactly when, they are needed.

Figure 15B:
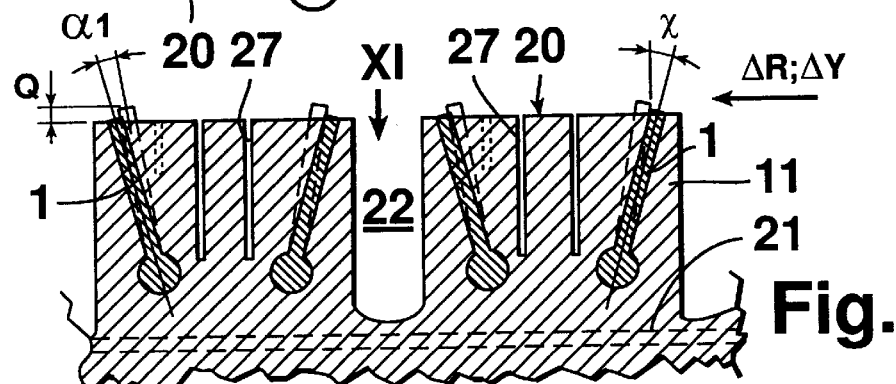
FIG. 15B depicts the positioning of the lamellar anti-skid studs according to the invention in the resting state and their operation, for example, during braking and respectively during acceleration, in a section through IX–IX in FIG. 15A.
Figure 16A:
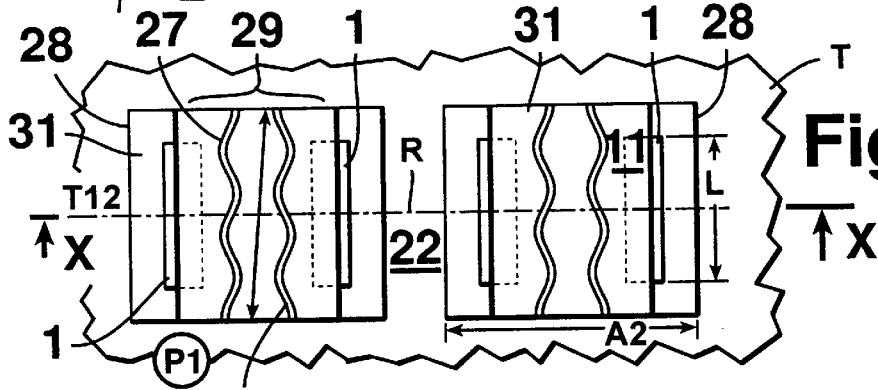
FIG. 16A depicts a fourth positioning of the lamellar anti-skid studs according to the invention, seen in a direction perpendicular to the tread, from direction XII in FIG. 16B.
Figure 16B:
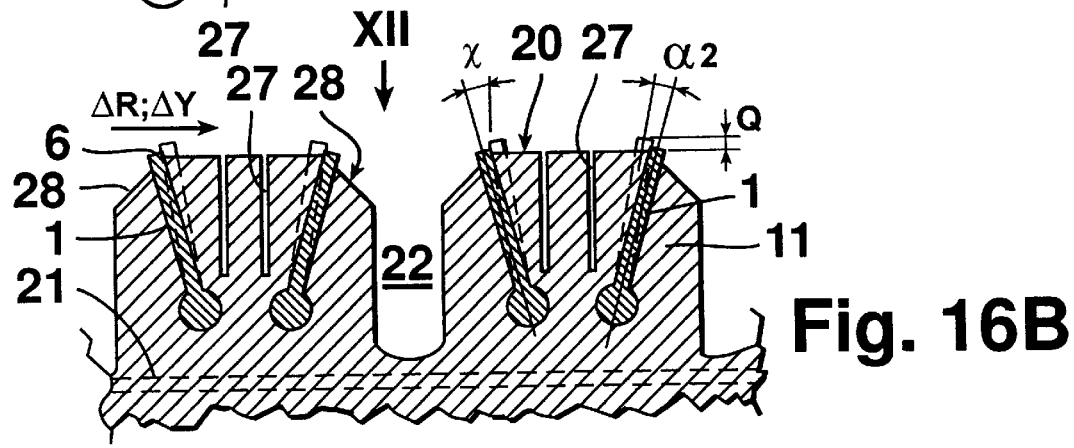
FIG. 16B depicts the positioning of the lamellar anti-skid studs according to the invention in the resting state and their operation, for example, during braking and respectively during acceleration, in a section through X—X in FIG. 16A.

Alternatively in the resting state, i.e. after mounting and when the tire is either not rotating or rotates at constant speed, the length Hi of the lamellar anti-skid studs forms according to another embodiment of the invention an angle $\chi$ to the normal N to the tread surface 20, as shown in FIGS. 15B and 16B. Likewise, in this resting state, even if the weight of the car is not bearing on the tread, the end face 6 of the lamellar anti-skid stud 1 is in approximately the same plane as the tread surface 20. In any case, in this situation the projection of the end face of the lamellar anti-skid stud from the tread surface 20 is substantially below 1 mm, and most commonly substantially below 0.5 mm, and as was already noted above, typically in the same plane as the tread surface 20. When the car is either accelerated or braked, whereupon a longitudinal force or skidding $\Delta R$ is produced, or if, respectively, the car is driven along a curve, whereupon a transverse force or skidding $\Delta Y$ is produced, both the pattern block 11 and the lamellar anti-skid stud 1 according to the invention, at the leading edge of the pattern block, tilt in the manner shown by dotted lines in FIGS. 15B and 16B. The lamellar anti-skid stud 1 at the trailing edge of the pattern block, for its part, remains approximately in its resting position. Thereupon, as far as is known, one or both of the following phenomena will occur. At that end of the stem portion of the lamellar anti-skid stud 1 which includes the end face 6 there is produced an effective projection increase Q, which, when pushing into the road surface, causes an increase in the tire grip. Another effect is that the end face 6 of the lamellar anti-skid stud 1 tilted to an angle of $\alpha 1$ or respectively $\alpha 2$ impinges against the road surface and thereby causes deceleration even if there is no projection increase Q. According to the present-day conception, both of these phenomena do occur, although the effect of the projection increase Q is most likely greater, especially in this second embodiment. The projection increase is according to the invention increased by the placement of the lamellar anti-skid studs at a slant in the said manner and in opposite edge areas of the pattern block, in which case, during acceleration or deceleration, or change in direction, the lamellar anti-skid stud in the leading edge of the pattern block will rise more erect, as can be understood. This effect is further enhanced by the fact that there is between these lamellar anti-skid studs 1 placed at opposite edges a slit 27 or slits 27 in the rubber of the pattern block 11, which slits render the pattern block more flexible and increase the grip of the pattern block. The deformation of the slits 27 is also indicated in the figures with dotted lines. At present, the projection increase Q is estimated to be of the order of 0.5 mm, 1 mm, or even 1.5 mm. With this mechanism, during constant driving the vehicle tires behave as tires without lamellar anti-skid studs, but whenever the speed or the direction is changed, the lamellar anti-skid studs become activated, having at least the same effect as have prior known studs in a tire. Thus the studs according to the present invention are active only when, and exactly when, they are needed.

Figure 19A:
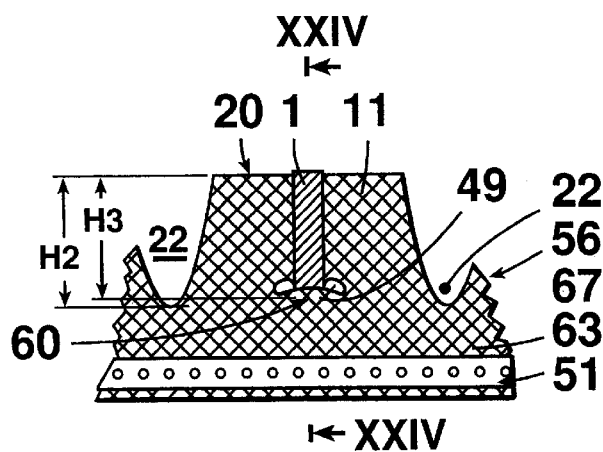
FIGS. 19A and 19B depicts an area of a stud in a vehicle tire elastically fitted with lamellar studs in accordance with the invention, taken on a larger scale from area XXIII in FIG. 18 and transversal to the width of the flat lamellar studs, respective to directions II, IV, VI, VII, XX and XXII in FIGS. 1A to 10B and section XVI—XVI and XVIII—XVIII in FIGS. 8A to 8C and 17. The figures shows the cushions under the anti-skid stud at the bottom of the stud holes according to the invention. In the first embodiment of the stud hole the cushion being of the same rubber as the surrounding tread layer, and in the second embodiment of the stud hole the cushion being of a more resilient rubber quality as compared to the harder rubber of the surrounding base layer.
Figure 19B:
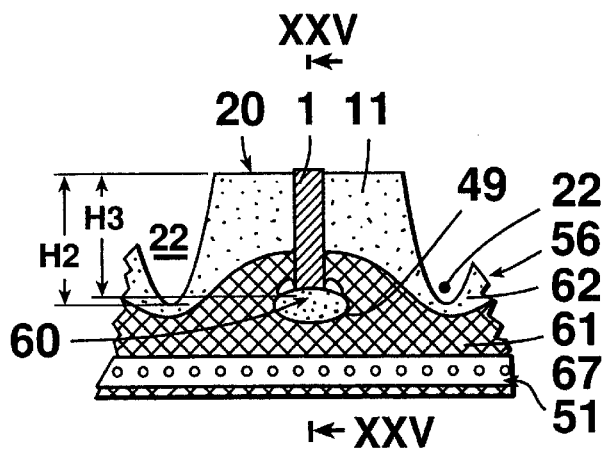
Figure 20A:
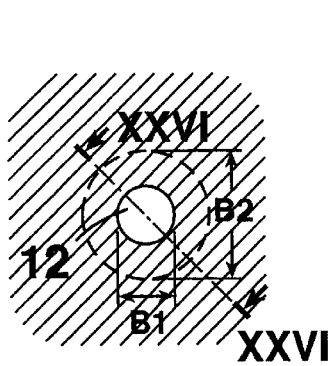
FIG. 20A depicts a third embodiment of the stud hole, without inserted stud, having a generally circular cross-sectional form, in a section through XXIV—XXIV in FIG. 19A and corresponding a planar section XXVII—XXVII in FIGS. 21A and 21B.
Figure 20B:
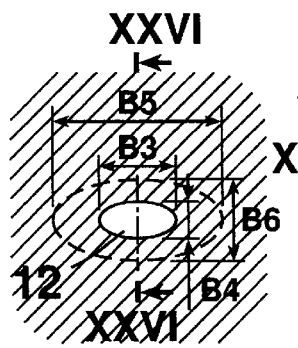
FIG. 20B depicts a fourth embodiment of the stud hole, without inserted stud, having a generally oval, in this case elliptical, cross-sectional form, in a section through XXV—XXV in FIG. 19B and corresponding a planar section XXVII—XXVII in FIGS. 21A and 21B.
Figure 20C:
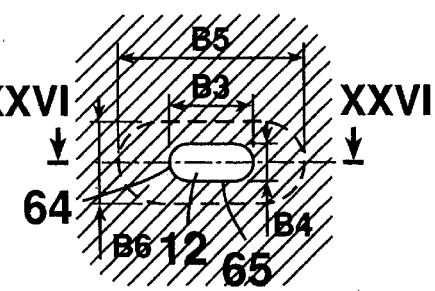
FIG. 20C depicts a fifth embodiment of the stud hole, without inserted stud, having a generally oval, in this case a combination of arcs and straight lines, cross-sectional form in a section through XXV—XXV in FIG. 19B and corresponding a planar section XXVII—XXVII in FIGS. 21A and 21B.

According to the second aspect of the invention the stud holes have a cross-sectional form in the orientation of the tread surface 20 substantially deviating that of the anti-skid stud described above. The cross-sections of the stud holes according to invention are either circular, as shown in FIGS. 14, 17 and 20A or oval, as shown in FIGS. 20B and 20C, i.e. quite unlike the flat lamellar stud with great width and small thickness. The diameter B1, B2 of said circular stud holes 12 is substantially smaller than the width L, K1, K4, K5 of said lamellar studs, which are to be inserted in the stud holes. In more detail this means that at preferably any level, or at least over a predetermined majority of levels, of the depth H3 of the stud holes the width of the stud is greater than the diameter of the stud hole, i.e. diameter B1 is smaller than width L and diameter B2 is smaller than width K1 or K4 or KS. The thickness D1, D2, K2, K3, K6, K7 of the stud is smaller than the respective diameter B1, B2 of the stud hole. The circular anti-skid stud holes 12 comprise preferably a generally cylindrical, i.e. linear portion 66 having a depth dimension H4, which is at least one-third or preferably at least half of the total depth H3 of said stud holes. It shall be understood that this cylindrical portion 66 can have a slight variation in its form, though not more than about 20% or preferably not more than 10% of the diameter B1 thereof, and so a substantially linear portion 66 is concerned. The variation of form from circular can be any kind. For the widening or bulge 4a–4f of said lamellar anti-skid studs 1 the stud holes 12 can further comprise a bottom portion 67 having a diameter B2 greater than the diameter B1 of the cylindrical portion, and having a depth dimension H5 at maximum one-third, but preferably at maximum one-fourth of the total depth of said stud holes. In any case the diameter B2 of the bottom portion 67 is smaller than the width of basal portion 3 of the stud, as defined above. The depth H3 of the stud holes 12 with a circular cross-section can also be straight as shown in FIG. 17 without different portions 66, 67. Further depth H3 of the stud holes 12 can be perpendicular to the tread surface 20 to provide the stud position of FIGS. 12–13, 17–18 and 19A–19b, or alternatively have an $\chi$ in respect to a normal to the tread surface 20 to provide the stud position of FIGS. 15A–16B.

Figure 21A:
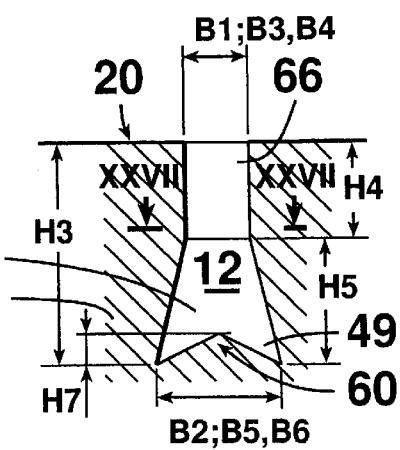
FIG. 21A depicts another typical form of generally circular or oval stud hole, without inserted stud, in longitudinal section within a tire tread provided with one rubber layer and a cushion, in the same view as in FIGS. 19A and 19B and in sections through XXVI—XXVI in FIGS. 20A to 20C.
Figure 21B:
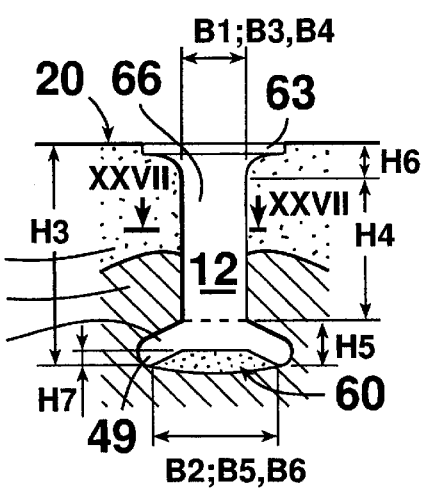
FIG. 21B depicts one typical form of generally circular or oval stud hole, without inserted stud, in longitudinal section within a tire tread provided with two rubber layers and a cushion, in the same view as in FIGS. 19A and 19B and in sections through XXVI—XXVI in FIGS. 20A to 20C.

As a most general definition it is defined that the mean width $\Sigma(L,K)_i/H1$ of the flat lamellar stud 1, where index i means each individual width value along the length H1 of the stud, is at least twice, or at least 2.5 times, or three times, the mean diameter $\Sigma B_j/H3$ of said circular stud holes, where index j means each individual diameter value along the depth of the stud hole 12. In practice the situation can also be evaluated roughly by a definition that: not necessarily at each level along the depth H3 of the stud holes, but at least within half and preferably within two-thirds of the depth H3, the width L, K1 K4, KS etc. of the stud shall be at least twice, or 2.5 times respectively, the diameter B1, B2 etc. of the stud hole. So any of the studs 1 disclosed in FIGS. 1A to 10B can be inserted within any of the stud holes 12 disclosed in FIGS. 17, 20A and 21A–21B, when the diameters B1 and/or B2 of these stud holes have a proper value. In tests it has been noticed, that this kind of seemingly inappropriate combination, flat lamellar studs 1 inserted in circular stud holes 12 in a tread of a tire, leads to excellent road-holding and driving properties as well as substantially extended life time. The generally circular stud holes 12 further allow positioning the lamellar studs 1 in different orientations, i.e. their width L in any angle $\beta 1$ or $\beta 2$ in respect to rolling direction R of the tire 50, as described earlier in this text. A larger depression with a shallow depth H6 shown in FIG. 21B is caused by a flange of the tool in the vulcanization mold, and can be neglected in this study and in defining the dimensions of the stud hole.

Alternatively the anti-skid stud holes of the invention can have a generally oval cross-sectional form, which have at least one main dimension B3 and one minor dimension B4 or, main dimensions B3, B5 and one minor dimensions B4, B6, as shown in FIGS. 20B and 20C. The ration of the minor dimension B4, B6 to the main dimension B3, B5 is substantially smaller than said ration between the total thickness D1, D2, K2, K3, K6, K7 and the respective width L, K1, K4, K5 of said flat lamellar studs. In this case too, the cross-sectional form of the stud holes 12 is more round, though not circular, than the lamellar stud, and so quite unlike the flat lamellar stud with great width and small thickness. The the main dimension of said oval stud holes 12 is so substantially smaller than the width the lamellar studs, which are to be inserted in the stud holes. In more detail this means that at preferably any level, or at least over a predetermined majority of levels, of the depth H3 of the stud holes the width L and K1, K4, K5 of the stud is greater than the main dimension B3 and respectively B5 of the stud hole, and the thickness D1, D2, K2, K3, K6, K7 of the stud is smaller than the respective minor dimension B4, B6 of the stud hole. The cross-sectional form of said anti-skid stud holes 12 is substantially an ellipse, as shown in FIG. 20B, or a combination of circular arcs, or a combination of circular arcs 64 and substantially straight lines 65. Also these oval anti-skid stud holes 12 preferably comprises a generally vertically linear portion 66 having a depth dimension H4, which is at least one-third or preferably at least half of the total depth H3 of said stud holes. It shall be understood that this oval portion 66, either elliptical or a combination of curves and/or straight lines, can have a slight variation in its form, though not more than about 20% or preferably not more than 10% of the main or respectively the minor dimensions B3, B5 thereof, and so a substantially linear portion 66 is concerned. The variation of form from basic form can be any kind. Said anti-skid stud holes 12 can further comprise a bottom portion 67 having a transverse dimension or transverse dimensions B4, B6 greater than the transverse dimension B3, B5 of the vertically linear portion, and having a depth dimension H5 at maximum one-third, but preferably at maximum one-fourth of the total depth of said stud holes of the total depth of said stud holes. The depth H3 of the stud holes 12 with an oval cross-section can also be straight, like that shown in FIG. 17, without different portions 66, 67. Further depth H3 of the stud holes 12 can be perpendicular to the tread surface 20 to provide the stud position of FIGS. 12–13, 17–18 and 19A–19b, or alternatively have an $\chi$ in respect to a normal to the tread surface 20 to provide the stud position of FIGS. 15A–16B. It is pointed out that generally the forms of the stud holes shown in FIGS. 21A-21B are valid both to the sections in the direction of the main dimensions and to the sections in the direction of the minor dimensions, and in principle to sections therebetween. The cross-sectional form of the stud holes according to invention shall not include sharp edges or corners, but always roundings between optional linear sections and/or sections with larger radii of curvature. The minimum radius of curvature has a value of at least half the thickness of the flat lamellar stud, and preferably a value of at least equal with thickness of the flat lamellar stud. The form shown in FIG. 20C gives an example of the previous alternative, if the thickness B4 and/or B6 are/is at least approximately equal with the respective thickness D1, D2 and/or K3, K6, K7, D1 of the stud. Of course the roundings in FIGS. 20B and 20C can have greater radii than the thickness of the stud.

As a most general definition it is defined that the mean width $\Sigma(L,K)_i/H1$ of the flat lamellar stud 1, where index i means each individual width value along the length H1 of the stud, is at least 1.5 times, or at least twice, or 2.5 times, the mean main dimension $\Sigma B_k/H3$ of said oval stud holes, where index k means each individual main dimension value along the depth of the stud hole 12. In practice the situation can also be evaluated roughly by a definition that: not necessarily at each level along the depth H3 of the stud holes, but at least within half and preferably within two-thirds of the depth H3, the width L, K1, K4, K5 etc. of the stud shall be at least 1.5 times, or twice, or 2.5 times respectively, the main dimensions B5, B6 etc. of the stud hole. So any of the studs 1 disclosed in FIGS. 1A to 10B can be inserted within any of the stud holes 12 disclosed in FIGS. 17, 20A and 21A–21B, when the main dimensions B3, B5 and/or the minor dimensions B4, B6 of these stud holes have a proper value. The generally oval stud holes 12 do not allow positioning the lamellar studs 1 in different orientations, i.e. their width L in angles β1 or β2 in respect to rolling direction R of the tire 50 is predetermined during vulcanization of the tire in the mold. It is allowed according to invention, that the general cross-sectional form of the stud holes can change in different levels along the depth H3 of the stud holes 12, whereupon the stud holes can have a circular form at the tread surface and an oval form at the bottom of the stud holes, or vice versa, or some other combination of forms.

The stud holes 12 in FIGS. 11A–16B shall be understood to have the circular or oval cross-sectional form according to the invention, because the circular or oval stud hole 12 over its depth H3 stretches to match or at least considerably match to the cross-sectional dimensions, width L, K1, K4, K5 and thickness D1, D2, K2, K3, K6, K7 of the flat lamellar stud 1. This stretching of the stud holes is possible because of the high elasticity or resiliency of the rubber material or rubber materials of the tire tread 56 at least around the stud holes 12. The cross-sectional form of the stud holes in its initial state without inserted stud so deviates from the cross-sectional form of the stud, i.e. its width and thickness, the stud holes having more rounded form than the lamellar studs.

The bottoms 49 of the stud holes 12 can be substantially planar as shown in FIG. 17, but it is preferred that the bottoms have a embossed form, whereupon the at least center area of the hole bottom has a convex surface towards the tread surface 20 and the edge areas of the hole bottom area farther away from the tread surface. So according to the third aspect of the invention the bottoms 49 of the stud holes have a form of a boss, which bring about a cushion 60 inside each of the stud holes 12 at their bottoms, as shown in FIGS. 18, 19A–19B and 21A–21B. Because the bosses forming the cushions are composed of a rubber, generally of a rubber of the tire, the rubber being always a highly resilient material, are these cushions 60 elastic or resilient, too. In the embodiment of FIG. 21A the cushion 60 is composed of the same rubber quality as the tire tread 56, in this case the tread comprising only one type of rubber at least within the area of stud holes. In the embodiment of FIG. 21B the cushion 60 is composed of a rubber material more elastic than that of the rubber quality surrounding the bottom 49 of the stud hole. In the situations shown in FIGS. 21A and 21B, the tire 50 in accordance with the invention is not yet provided with studs, but otherwise finished. After flat lamellar anti-skid studs 11 have been inserted in the circular or oval stud holes 12 having cushions 60 at their bottoms, as shown in FIGS. 19A or 19B, a tire 50 elastically fitted with studs shown in FIG. 18 in principle is obtained.

The elastic cushions 60 are produced at the bottoms 49 of stud holes 12 e.g. in the manner described in the publication U.S. Pat. No. 5,800,644, whereupon the elastic cushions are provided in the tire tread 56 within the stud holes before the studs are inserted. The upper surface 57 of the elastic cushion 60 facing the tread 56 is at a mounting depth of the bottom surface 58 of the anti-skid studs 1 intended for the tire, measured from the tread. This arrangement results in that the bottom surface 58 of the studs inserted in the stud holes 12 will bear against the elastic cushions 60, which is clearly visible in FIGS. 19A and 19B. The diameter or minor dimension of the cushions approaching the cushions approaching the diameter B2 or minor dimension B6 of the bottom portion 67 is greater than the thickness D1, D2, K2, K3, K6, K7 of the lamellar stud 1, and the diameter or main dimension of the cushions approaching the diameter B2 or main dimension B5 of the bottom portion 67 is greater than the width L, K1, K4, K5 of the lamellar stud 1. The general form of the elastic cushion 60 in the orientation of the tread surface is typically, but not necessarily, similar to that of the cross-section of the bottom portion 67 of the stud hole. In spite of these differences in dimensions between cushion 60 in the circular or oval stud hole 12 and the flat lamellar stud 1, the cushion operates without problems to lower the penetrating force F1 of the lamellar anti-skid stud, which penetrating force is effective in direction perpendicular to the tire tread 20. The thickness H7 of the elastic cushion, as measured from the edge between the embossed cushion and the wall of the stud hole and the top of the convex form of the cushion, is at least 3%, or preferably between 7%–15%, and typically, but not necessarily, below 20% of the depth H3 of the stud holes in question. The thickness of the elastic cushion depends on the length H1 of the stud relative to the overall thickness of the tread rubber layers 63 or respectively 61 and 62. When minimum penetrating force is desired for anti-skid studs 1, the thickness H7 of the elastic cushion in a direction perpendicular to the tread surface 20 must be as great as possible, i.e. at least approaching the maximum thickness described above.

In accordance with the invention the elastic cushions 60 can comprise the rubber or other elastomer of the tread 56, especially in case the tread consists of one rubber quality only at least around stud holes, as shown in FIGS. 19A and 21B. This alternative provides relatively hard cushions having the hardness of the single rubber layer 63, located on the tire carcass 51. Thus, the elastic cushions 60 are made of a material having a hardness of typically between 67 sh°A and 63 sh°A. Because of the embossed form the cushion functions anyway as an element lowering the penetrating force F1. However, the hardness of the material of the elastic cushion 60 shall preferably be in the same range as that of a friction tire, i.e. the hardness of the outmost second rubber layer 62 forming tread surface 20, and approximately in the range from 50 sh°A to 63 sh°A, and simultaneously the tire tread including at least a first rubber layer 61 facing the carcass 51. The softer more resilient cushions 60, which also have the embossed form defined above, lower the penetrating force F1 still more. These more resilient cushions comprising the same rubber, the "cap rubber", as the outmost second rubber layer 62, and having the hardness of the rubber quality of this outmost second rubber layer 62, are practically manufactured according to said publication U.S. Pat. No. 5,800,644. When minimum penetrating force F1 against the road, brought about by the springback factor generated by compressive deformation of the cushion 60, is desired for the anti-skid stud, the elastic cushion material must have maximum elasticity and thus minimum hardness. The first rubber layer 61 are made of such a rubber or other elastomer that has lower elasticity than the elastic cushion material. Consequently, the hardness of the first rubber layer 61, the "base rubber" is greater than 63 sh°A and preferably greater than 65 sh°A. Materials with a hardness in the range of 67 sh°A to 75 sh°A are typically used. The thickness of the first rubber layer 61 and the second rubber layer 62 of course varies as a function of the tire size and purpose, but when a passenger car tire is being concerned, the thickness of the first rubber layer, the base rubber above, is initially in the range of 2 to 10 mm, and the thickness of the second rubber layer, the cap rubber described above, is initially in the range of 5 to 8 mm, when the tire is brought into the vulcanization. If a bus or truck tire is being concerned, the layer thicknesses will obviously be greater. An elastic cushion can be provided in the finished tire 50 which extends up to its carcass 51, in other words an elastic cushion 60 with maximum thickness, but typically a layer of the base rubber thinner than the initial thickness of the first rubber layer 61 is left between the elastic cushions 60 and the carcass 51, in a predetermined level within the height H2 of the tire tread blocks 11.

Generally speaking, the elasticity of the elastic cushion material in accordance with the invention is higher than that of the rubber layer material into which the elastic cushion settles in the finished tire 30, in other words, the hardness of the elastic cushion is less than that of the rubber quality with which the side of the elastic cushion facing away from the tread will be in contact. This definition also applies to tires whose tread 56 is made up of more than two rubber layers.

According to a still further aspect of the invention, generally circular anti-skid studs 70 are inserted in the stud holes 12 having an oval cross-sectional form described earlier in this specification. For this purpose the oval cross-sectional form of the stud holes has a main dimension B3, B5 and a minor dimension B4, B6, which are transverse and typically perpendicular to each other. The ratio of the main dimension to the minor dimension has a value of at least one-and-a-half, i.e. 1:1.5, or preferably a value of at least two. The other features and dimensions of the oval stud holes for this purpose are the same as described earlier in this text and shown in FIGS. 20B–20C and 21A–21B. The generally circular anti-skid studs 70 can be any known or new type and so the circular studs generally comprise a stem portion and a basal portion, which is wider than the stem portion and/or separated by a neck portion from the stem portion. One of such anti-skid stud 70 is in principle shown in FIG. 3B, when the form is thought to be in accordance with this figure as seen from any of its elevational view directions V, i.e. this surface configuration is rotated around the line imitating the central plane 30 parallel to the length H1 of the stud. It can readily be understood that in this case the dimensions D1 and K6 mean the diameter at the top of stem portion 2 and respectively the diameter of basal portion 3 in the stud. Because circular studs are quite familiar and known as such, it is not considered necessary to describe these in more detail. The cross-sectional form of the generally circular studs in the orientation of the tread surface 20, when inserted in the stud holes, can vary slightly from strictly circular form at least partly, e.g. have a slightly square, oblong, triangular or other form. The deviation from exact circular form is anyway typically smaller than 30% or 20% as compared to the respective mean diameter in a level along the length H1 of the stud. Further the mean diameter of said generally circular anti-skid studs is substantially greater than said minor dimensions and equal or smaller than said main dimensions. As a formula something like $B4, B6 >> \Sigma \emptyset (D1, K6)_N / H1 \geq B3, B5$, where the index N means each individual main dimension value at each level along the depth of the stud hole 12, and providing use to a so called weighted average value. So, excluding the features of the lamellar stud and the features of the circular stud holes, all features concerning the oval stud holes disclosed in previous passages of this description are valid in context of anti-skid studs having oval or round cross-sectional form.

We claim:

1. A vehicle tire comprising:

a tire carcass and side walls;

at least one layer of rubber forming a tire tread with a tread surface on top of the carcass;

a tread pattern in said rubber layer comprising a plurality of blocks at least in the circumferential direction of the tire and separated by grooves;

anti-skid stud holes within at least some of said blocks, said anti-skid stud holes having a total depth within said tread rubber layer and having a generally circular cross-sectional form;

lamellar anti-skid studs in said stud holes, said lamellar studs comprising a stem portion and a basal portion, the basal portion being wider than the stem portion and/or separated by a neck portion from the stem portion, the ratio of the total thickness of said lamellar studs to the width of said lamellar studs in the orientation of said tread surface being at maximum one-third; and the diameter of said circular stud holes is substantially smaller than the width of said lamellar studs, wherein the cross-sectional shape of the stud holes differs from the cross-sectional shape of the lamellar studs.

2. The vehicle tire of claim 1, wherein said anti-skid stud holes comprises a generally cylindrical portion having a depth dimension, which is at least one-third of the total depth of said stud holes.

3. The vehicle tire of claim 2, wherein said anti-skid stud holes further comprises a bottom portion having a diameter greater than the diameter of the cylindrical portion, and having a depth dimension at maximum one-third of the total depth of said stud holes.

4. The vehicle tire of claim 3, wherein said anti-skid stud holes further comprises a cushion disposed at interior end of said stud holes, said cushion having a embossed form.

5. The vehicle tire of claim 4, wherein the tire tread in the area of the stud holes is composed of substantially one layer of rubber, and said cushions are of the rubber of said one rubber layer.

6. The vehicle tire of claim 4, wherein the tire tread in the area of the stud holes is composed of at least two layers of rubber, a base rubber next to the carcass, and a cap rubber on top of the base rubber, the base rubber being harder than the cap rubber, and wherein said cushions are of the cap rubber.

7. The vehicle tire of claim 1, wherein said total thickness of the lamellar stud is within the range of ¼–1/20 of said width of the stud and, and said width of the stud is substantially smaller than the width of the pattern blocks, and wherein the length of the anti-skid studs is at maximum equal to the height of the pattern blocks measured from the base of said grooves.

8. The vehicle tire of claim 1, wherein the basal portion of the lamellar studs comprises a bulge projecting from the stem portion:

in the orientations of both the width and the total thickness of the stud; or only in the orientation of the width of the stud; or only in the orientation of the total thickness of the stud.

9. The vehicle tire of claim 1, wherein the mean width of lamellar portion stud is at least two times the mean diameter of said circular stud holes.

10. The vehicle tire of claim 1, wherein the width of the stem portion of the stud is within the range of 3 mm–20 mm, and the total thickness of the stud is within the range of 0.5 mm–3 mm, and the length of the stud is within the range of 5 mm–15 mm.

11. The vehicle tire of claim 1, wherein said lamellar anti-skid studs are composed of a sintered cermet material being a combination of at least TiC+NbC as a hard wear-resistant component, an at least Ni+Mo as a binder.

12. The vehicle tire of claim 1, wherein said total depth of the stud holes is:

substantially perpendicular to the tread surface; or relative to the normal to the tread surface at an angle which is within the range of 3°–45°.

13. The vehicle tire of claim 1, wherein the width of the inserted lamellar anti-skid studs located:

in first positions transverse to the rolling direction forms, relative to the rolling direction, a first angle which is within the range of 60°–90°; and/or in second positions longitudinal relative to the rolling direction forms, relative to the rolling direction, a second angle which is within the range of 60°–0°.

14. A vehicle tire comprising:

a tire carcass and side walls;

at least one layer of rubber forming a tire tread with a tread surface on top of the carcass;

a tread pattern in said rubber layer comprising a plurality of blocks at least in the circumferential direction of the tire and separated by grooves;

anti-skid stud holes within at least some of said blocks, said anti-skid stud holes having a total depth within said tread rubber layer and having a generally oval cross-sectional form;

lamellar anti-skid studs in said stud holes, said lamellar studs comprising a stem portion and a basal portion, the basal portion being wider than the stem portion and/or separated by a neck portion from the stem portion, the ratio of the total thickness of said lamellar studs to the width of said lamellar studs in the orientation of said tread surface being at maximum one-third; and said oval cross-sectional form having a main dimension and a minor dimension, and the ratio of the minor dimension to the main dimension is substantially smaller than said ratio between the total thickness and the width of said lamellar studs, wherein the cross-sectional shape of the stud holes differs from the cross-sectional shape of the lamellar studs.

15. The vehicle tire of claim 14, wherein the cross-sectional form of said anti-skid stud holes is substantially an ellipse, or a combination of circular arcs, or a combination of circular arcs and substantially straight lines.

16. The vehicle tire of claim 14, wherein said anti-skid stud holes comprises a generally vertically linear portion having a depth dimension, which is at least one-third of the total depth of said stud holes.

17. The vehicle tire of claim 16, wherein said anti-skid stud holes further comprises a bottom portion having a transverse dimension greater than the transverse dimension of the vertically linear portion, and having a depth dimension at maximum one-third of the total depth of said stud holes.

18. The vehicle tire of claim 17, wherein said anti-skid stud holes further comprises a cushion disposed at interior end of said stud holes, said cushion having a embossed form.

19. The vehicle tire of claim 18, wherein the tire tread in the area of the stud holes is composed of substantially one layer of rubber, and said cushions are of the rubber of said one rubber layer.

20. The vehicle tire of claim 18, wherein the tire tread in the area of the stud holes is composed of at least two layers of rubber, a base rubber next to the carcass, and a cap rubber on top of the base rubber, the base rubber being harder than the cap rubber, and wherein said cushions are of the cap rubber.

21. The vehicle tire of claim 14, wherein said total thickness of the lamellar stud is within the range of ¼–1/20 of said width of the stud and, and said width of the stud is substantially smaller than width of the pattern blocks, and wherein the length of the anti-skid studs is at maximum equal to the height of the pattern blocks measured from the base of said grooves.

22. The vehicle tire of claim 14, wherein the basal portion of the lamellar studs comprises a bulge projecting from the stem portion:

in the orientations of both the width and the total thickness of the stud; or only in the orientation of the width of the stud; or only in the orientation of the total thickness of the stud.

23. The vehicle tire of claim 14, wherein the mean width of the lamellar stud is at least two times the mean transverse dimension of said oval stud holes.

24. The vehicle tire of claim 14, wherein the width of the stem portion of the stud is within the range of 3 mm–20 mm, and the total thickness of the stud is within the range of 0.5 mm–3 mm, and the length of the stud is within the range of 5 mm 15 mm.

25. The vehicle tire of claim 14, wherein said lamellar anti-skid studs are composed of a sintered cermet material being a combination of at least TiC+NbC as a hard wear-resistant component, and at least Ni+Mo as a binder.

26. The vehicle tire of claim 14, wherein said total depth of the stud holes is:

substantially perpendicular to the tread surface; or relative to the normal to tread surface at an angle which is within the range of 3°–45°.

27. The vehicle tire of claim 14 Wherein the width of the inserted lamellar anti-skid studs located:

in first positions transverse to the rolling direction forms, relative to the rolling direction, a first angle which is within the range of 60°–90°; and/or in second positions longitudinal relative to the rolling direction forms, relative to the rolling direction, a second angle which is within the range of 60°–0°.

28. A vehicle tire comprising:

a tire carcass and side walls;

at least one layer of rubber forming a tire tread with a tread surface on top of the carcass;

a tread pattern in said rubber layer comprising a plurality of blocks at least in the circumferential direction of the tire and separated by grooves;

anti-skid stud holes within at least some of said blocks, said anti-skid stud holes having a total depth within said tread rubber layer and having a generally oval cross-sectional form;

said oval cross-sectional form having a main dimension and a minor dimension transverse to each other, said main dimension being substantially greater than said minor dimension; and generally circular anti-skid studs in said stud holes, said circular studs comprising a stem portion and a basal portion, which is wider than the stem portion and/or separated by a neck portion from the stem portion.

29. The vehicle tire of claim 28, wherein said ration of the main dimension to the minor dimension has a value of at least two, and the mean diameter of said generally circular anti-skid studs is substantially greater than said minor dimension and smaller than said main dimension.

* * * * *